United States Patent [19]

Yamada et al.

[11] Patent Number: 5,424,106
[45] Date of Patent: Jun. 13, 1995

[54] OPTICAL INFORMATION RECORDING MEDIUM AND METHOD OF DESIGNING ITS STRUCTURE

[75] Inventors: Noboru Yamada, Hirakata; Nobuo Akahira, Yawata; Kenichi Nishiuchi, Moriguchi; Kenichi Nagata, Nishinomiya; Eiji Ohno, Hirakata; Shigeaki Furukawa, Nara, all of Japan

[73] Assignee: Matsushita Electric Industrial Co., Ltd., Osaka, Japan

[21] Appl. No.: 45,876

[22] Filed: Apr. 15, 1993

[30] Foreign Application Priority Data

| Apr. 17, 1992 | [JP] | Japan | 4-097606 |
| Apr. 17, 1992 | [JP] | Japan | 4-097607 |
| Jun. 17, 1992 | [JP] | Japan | 4-157730 |

[51] Int. Cl.$^6$ .............................................. B32B 3/00
[52] U.S. Cl. ..................................... 428/64; 428/65; 428/913; 428/457; 430/945; 430/270; 346/135.1
[58] Field of Search .............. 428/64, 65, 457, 913; 346/76 L, 135.1; 430/945; 362/288

[56] References Cited

U.S. PATENT DOCUMENTS

| 4,839,883 | 6/1989 | Nagata et al. | 369/286 |
| 4,954,379 | 9/1990 | Nishida et al. | 428/64 |
| 5,093,174 | 3/1992 | Suzuki et al. | 428/64 |
| 5,102,709 | 4/1992 | Tachibana | 428/64 |
| 5,273,861 | 12/1993 | Yamada | 430/271 |

FOREIGN PATENT DOCUMENTS

| 0319037 | 6/1989 | European Pat. Off. |
| 0347801 | 12/1989 | European Pat. Off. |
| 0466670 | 1/1990 | European Pat. Off. |
| 1-149238 | 6/1989 | Japan |
| 3-113844 | 5/1991 | Japan |
| 4-102243 | 4/1992 | Japan |

OTHER PUBLICATIONS

Applied Physics Letters, vol. 18, No. 6 (1971) pp. 254–257.
Proceedings of SPIE, *Optical Mass Data Storage II*, vol. 695 (1986) pp. 80–85.
Applied Physics Letters, vol. 46, No. 8 (1985) pp. 734–737.
Journal of Applied Physics, vol. 69, No. 5 (1991) pp. 2849–2856.
Journal of Applied Physics, vol. 64, No. 4 (1988) pp. 1715–1719.
Japanese Journal of Applied Physics, vol. 31, No. 2B (1992) pp. 653–658.
Optical Memory Symposium (1988) pp. 39–40.
Optical Memory Symposium (1992) pp. 21–22.
Wave Optics, pp. 199–236.

*Primary Examiner*—Patrick J. Ryan
*Assistant Examiner*—Elizabeth Evans
*Attorney, Agent, or Firm*—Willian Brinks Hofer Gilson & Lione

[57] ABSTRACT

Phase-change-type optical recording medium comprises a first dielectric layer, a recording layer made of a phase change material, a second dielectric layer and a reflecting layer wherein the thicknesses of the first and second dielectric layers are determined for a given thickness of the recording layer so that the following conditions are satisfied;

$$\Delta A + \Delta R \geq 20\% \text{ and } \Delta A \geq 5\%$$

wherein $$\Delta A = A(cry) - A(amo),$$

A(cry), A(amo): light absorption rates of the recording layer in the crystal state and amorphous state, respectively, $$\Delta R = R(cry) - R(amo),$$

R(cry) and R(amo): light reflection rates of the recording lates in the crystal state and amorphous state, respectively.

19 Claims, 17 Drawing Sheets

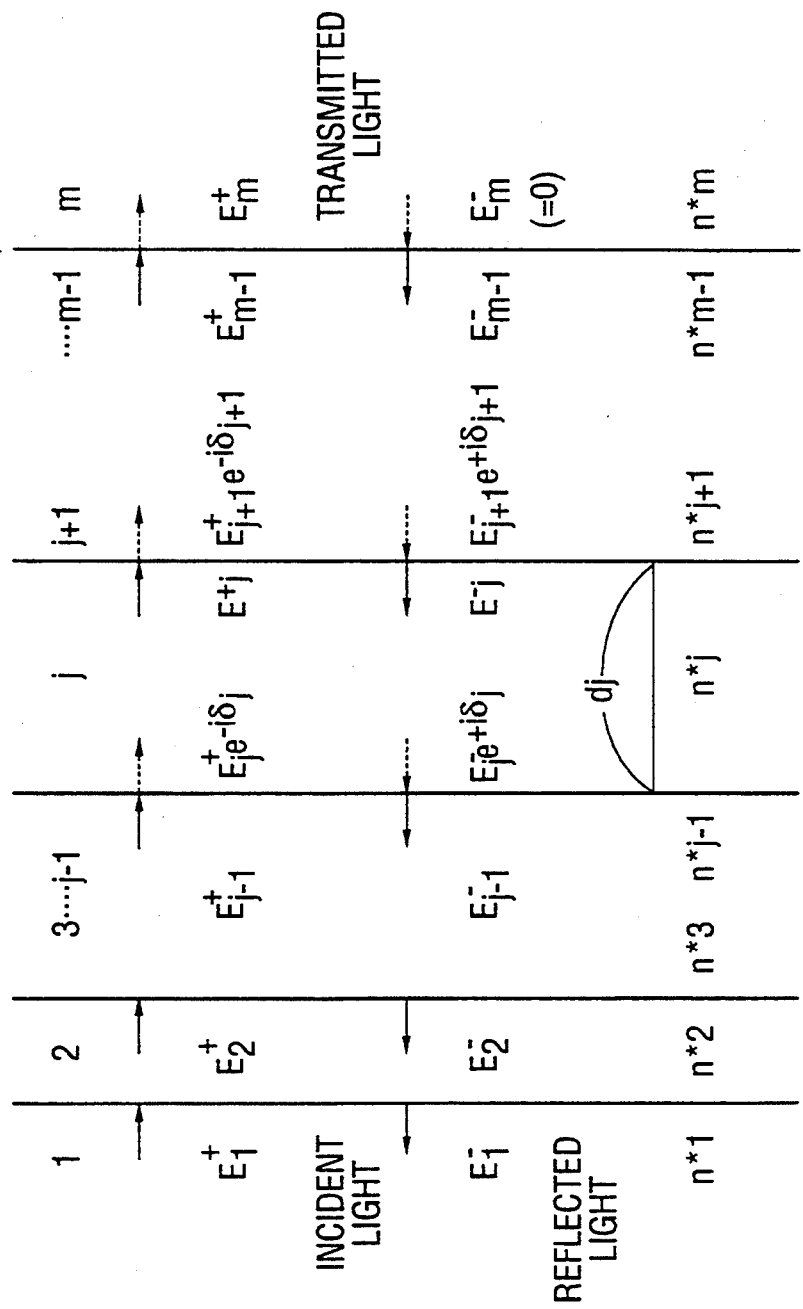

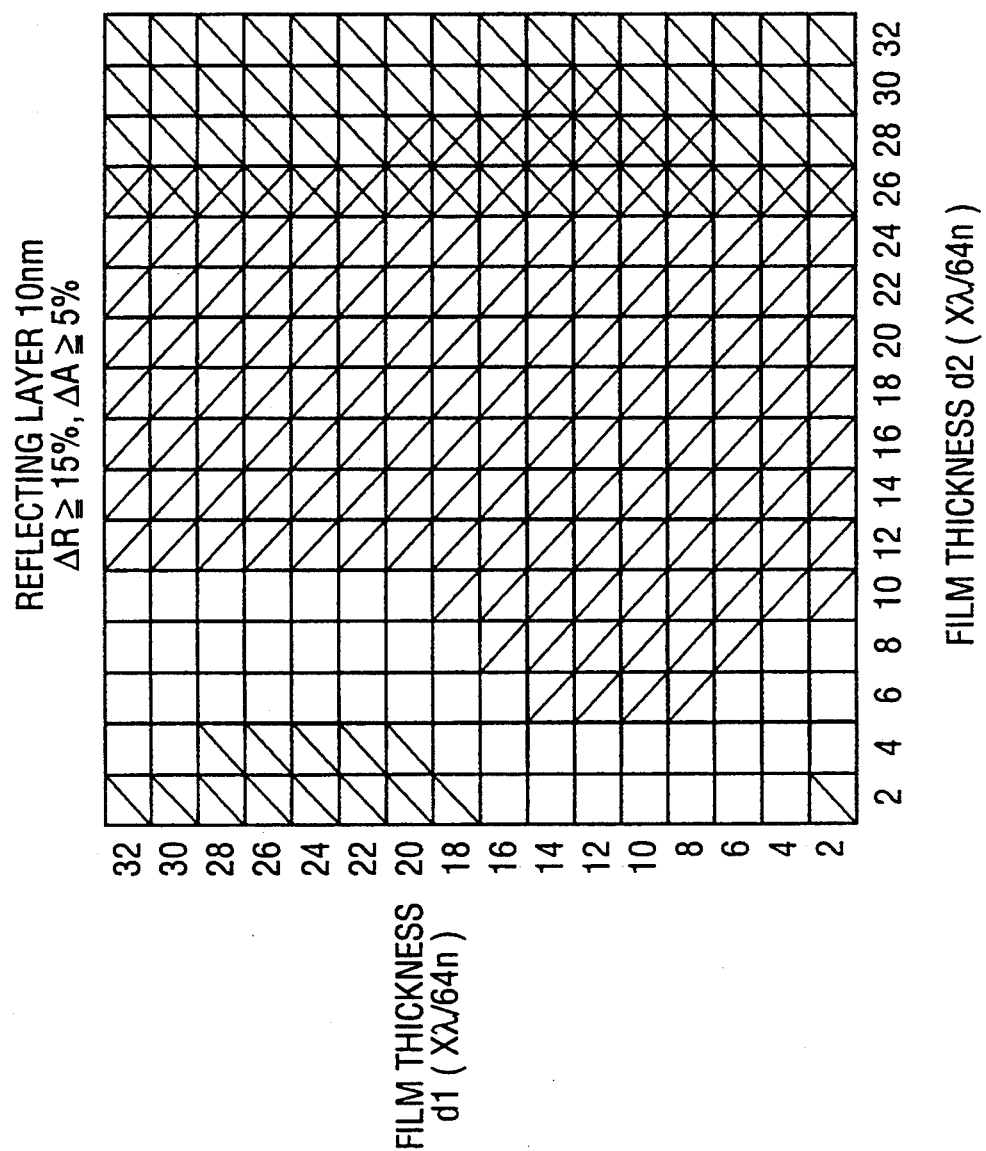

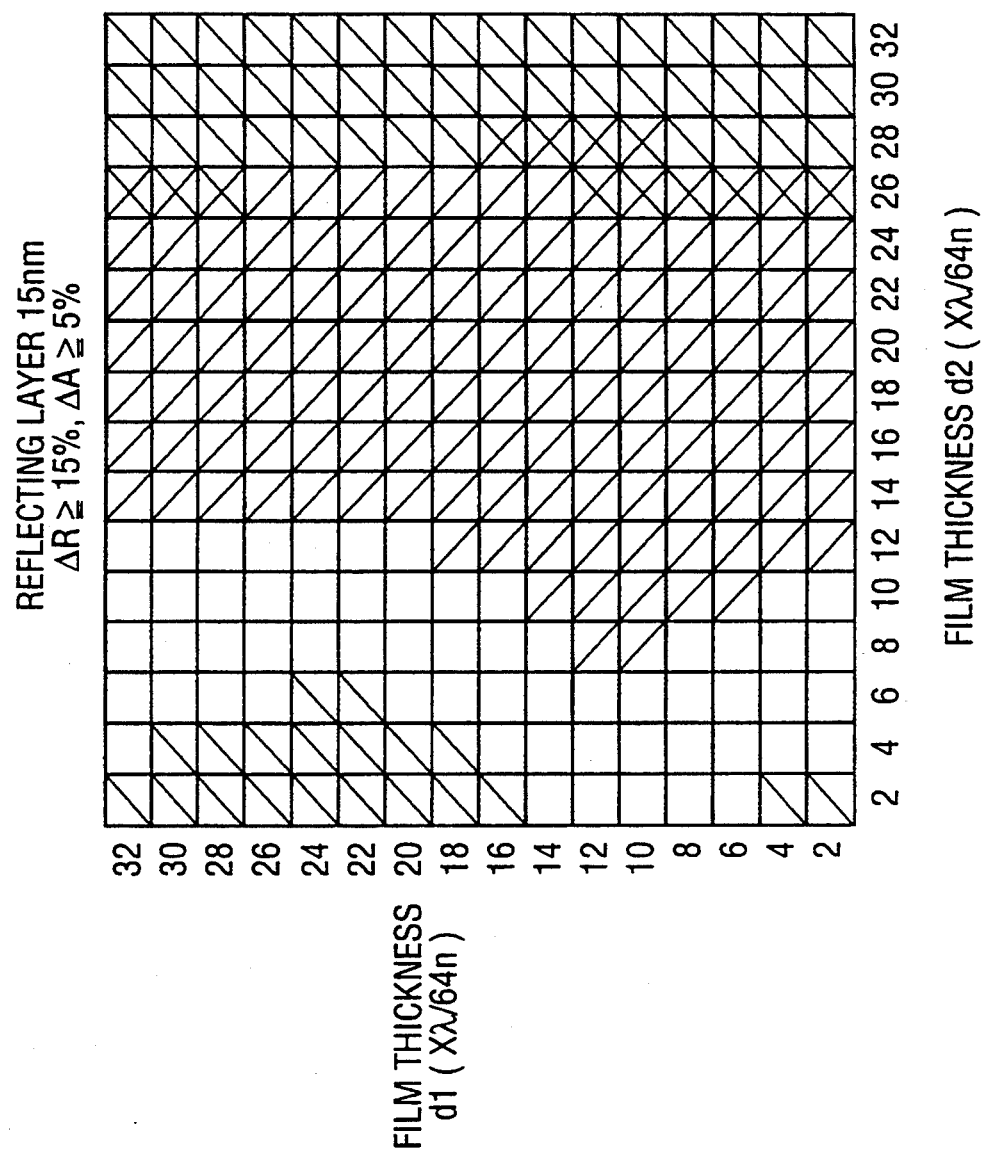

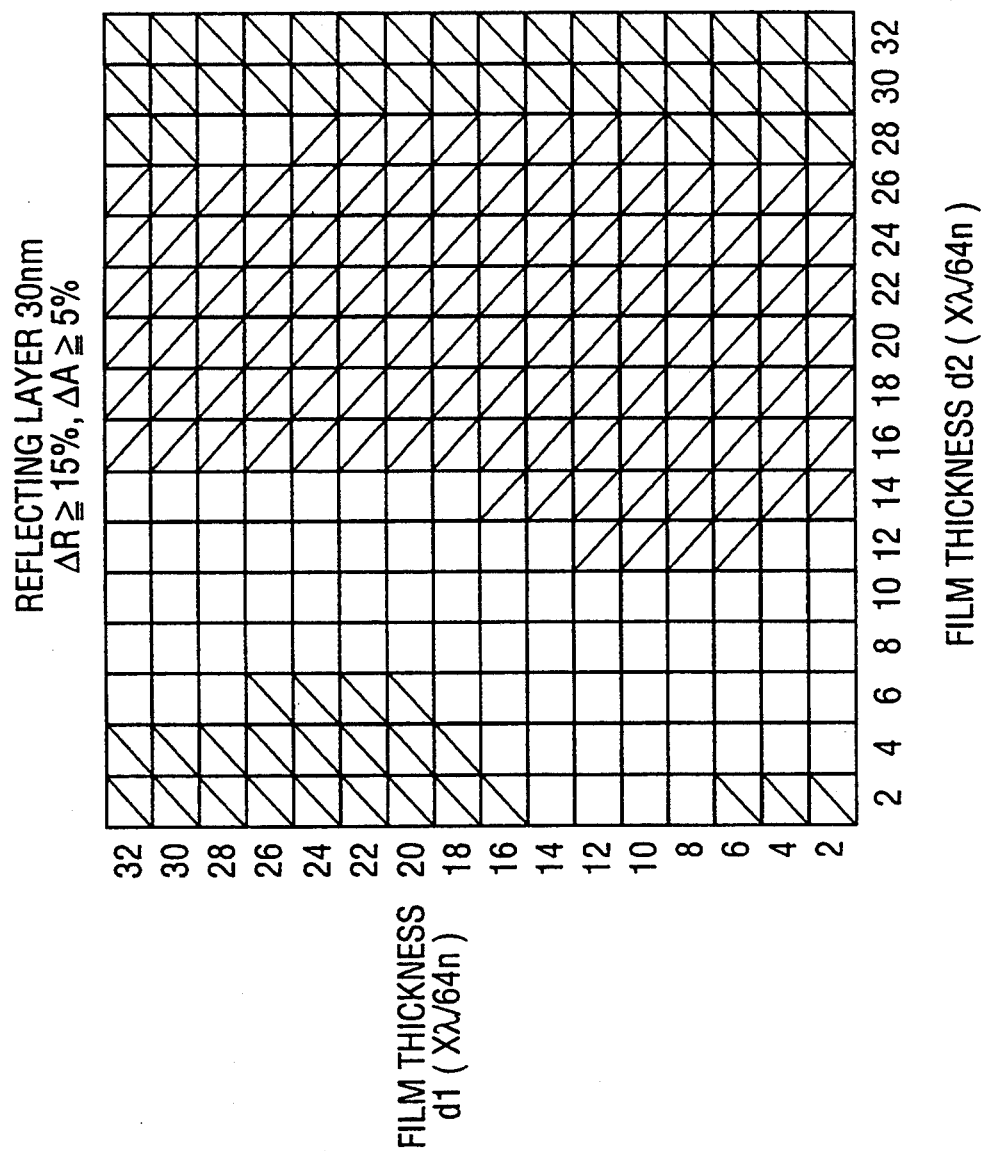

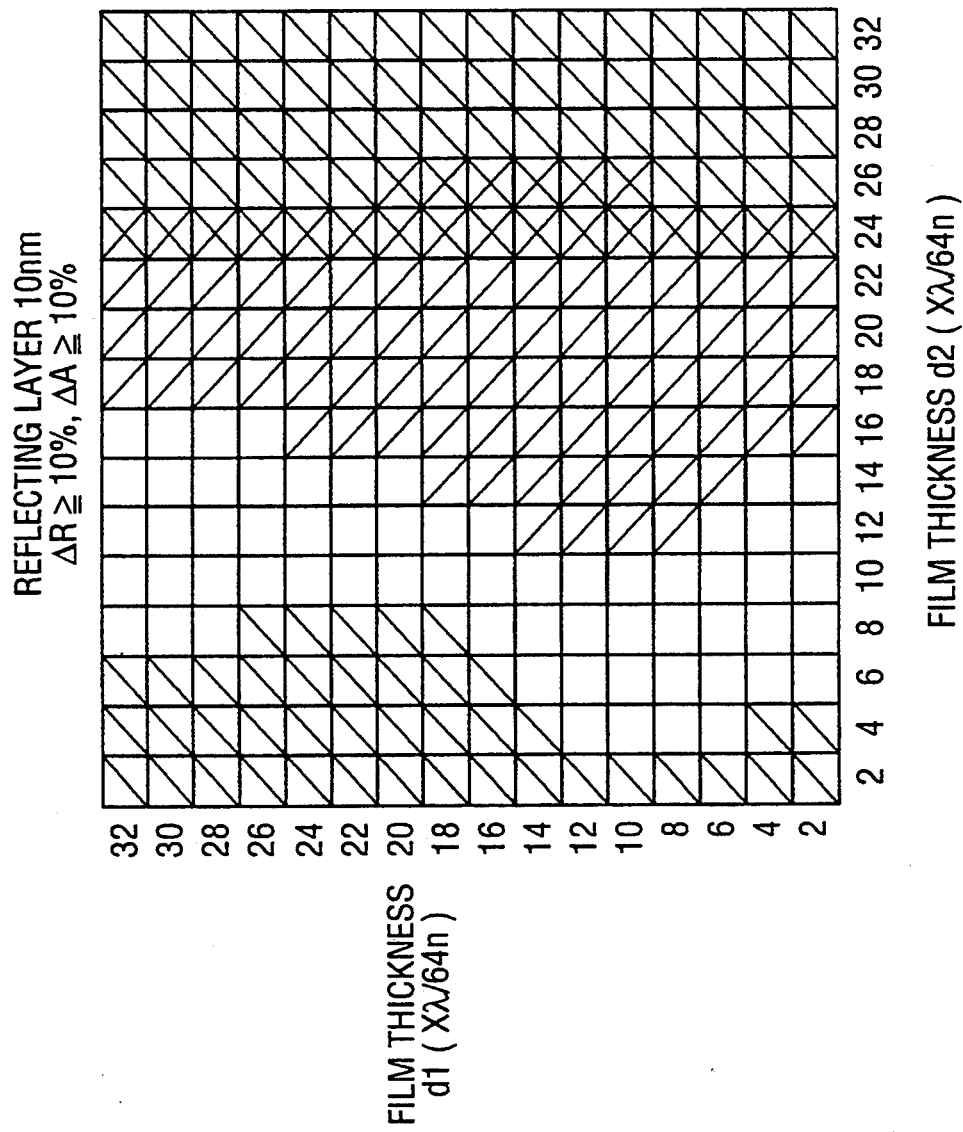

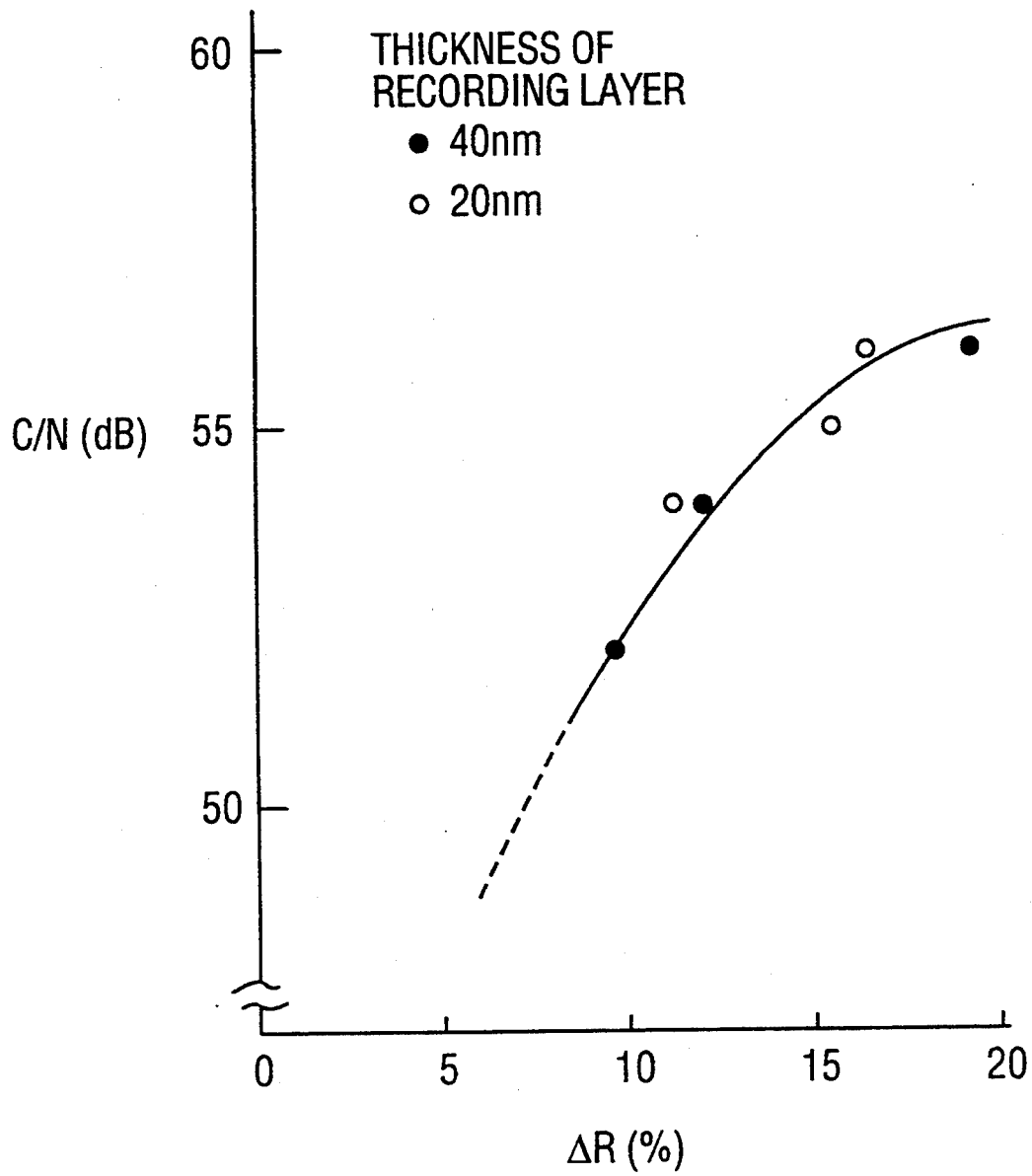

OPTICAL INFORMATION RECORDING MEDIUM AND METHOD OF DESIGNING ITS STRUCTURE

BACKGROUND OF THE INVENTION

1. Field of the Invention

The present invention relates to the construction of an erasable optical information recording medium and methods of designing its structure such that information signals of high signal quality are overwritten by irradiating a thin film of a phase change material formed on a substrate with a high energy beam such as a laser beam.

2. Description of the Related Art

It is already known as the laser-induced phase change phenomenon that the local heating of a chalcogenide thin film formed on a substrate by irradiating it with a well-focused laser beam produces a reversible change in the optical characteristics, ie. the optical constants: the refractive index and the extinction coefficient, of its microscopic part. In fact, by choosing an appropriate condition for laser irradiation, it is possible to rapidly change the irradiated part from the amorphous phase, which is a comparatively less ordered state of the arrangement of atoms, into the crystal phase, which is a comparatively more ordered state of the arrangement of atoms, and conversely from the crystal phase into the amorphous phase. The information recording that utilizes this phenomenon is called phase change optical recording, and, as an example, optical disk media that are used for high-density information recording have been developed.

Many Te-based alloys of near-eutectic compositions have been examined for quite a long time as candidates of recording thin film materials to be used in phase change optical disk media. For example, $Te_{81}$-$Ge_{15}Sb_2S_2$ (J. Feinleib et al. Appl. Phys. Lett. 18(1971), 254) and $Te_{60}Ge_4Sn_{11}Au_{25}$ (N. Yamada et al. Proc. SPIE 695(1986), 79) have been the objects of the study. However, thin films of these materials having near-eutectic compositions require at least several hundreds nanoseconds of laser irradiation for crystallization and, therefore, are inadequate for high speed overwriting. In order to solve this problem, it has been recently found that certain stoichiometric compound materials such as GeTe (M. Chen et al. Appl. Phys. Lett. 46(1985), 734), $GeSb_2Te_4$ and $Ge_2Sb_2Te_5$ (N. Yamada et al. J. Appl. Phys. 69(1991), 2849), $In_3SbTe_2$ (J. Appl. Phys. 64(1988), 1715) and etc. are crystallized by short time laser irradiation of about or less than 100 ns, and these materials are currently attracting considerable attention as recording materials that allow high speed overwriting.

A film structure of an erasable optical disk is a three-layer structure such that a dielectric film layer composed of an oxide or a sulfide or a mixture of these compounds, e.g. a ZnS film, a $SiO_2$ film, or a ZnS—$SiO_2$ mixture film, a recording layer composed of a Te-based alloy mentioned above, and a second dielectric film layer are successively deposited on a transparent substrate of resin or glass. A four-layer structure that is made up of the above three-layer structure and an additionally overlaid metallic reflecting layer composed of a Au alloy, an Al alloy, or a Ni—Cr alloy is also known (See, for example, U.S. Pat. No. 4,839,883).

In general, the purpose of adding a metallic reflecting layer is first to enhance the efficiency of light absorption by the recording layer by blocking the passing light so that even a thin recording layer can realize a high degree of light absorption. The second purpose is to enhance the effects of interference of the light reflected from the top surface and the bottom surface of the recording layer by increasing the quantity of the light reflected from the bottom. Since optical phases of the light reflected from the top surface and the light returning from the bottom surface are different, they interfere each other and the interference is either constructive or destructive. Therefore, if the light returning from the bottom surface is designed to be larger, then the interference effects become enhanced, and the difference of the reflectances before and after recording becomes larger. The third purpose is to relieve thermal damage to the recording layer by efficiently diffusing heat produced in the recording layer. In order to fulfill these three objectives, the reflecting layer is required to have sufficiently large reflectance and heat capacity. Therefore, the thickness of the reflecting layer that satisfies these three objectives has usually been chosen to be larger than the one in which the reflectance of the reflecting layer is sufficiently saturated.

It is already known that one of the greatest advantages of phase change optical disks is that an information signal is easily overwritten on it using a single laser beam as its recording means. Specifically, the laser power is modulated, according to the signal level of each point, between the peak level (amorphizing level), which is a power level sufficiently high to melt the irradiated part, and the bias level (crystallizing level), which is lower than the peak level and high enough to raise the temperature above the crystallizing temperature. The information track of the revolving optical disk medium is irradiated with the modulated laser beam so that, even if an old information signal is recorded on the track, a new information signal is recorded while the old signal is erased at the same time (e.g. JP-A-SHO 56-145530). Therefore, phase change optical disks take the same rewriting time as net recording time and are considered to be favorable to the rewriting of video signals and audio signals, which are continual for a long time. In fact, research has been done on degital audio optical disks based on phase-change recording techniques (e.g. K. Nishiuchi et al. Jpn. J. Appl. Phys. 31(1992), 653). Moreover, phase change optical disks do not require magnetic circuit components for recording and playback. Therefore, another advantage is that the recording head can be simplified, and the whole apparatus can be made compact.

However, in the meantime, a problem characteristic of high-speed overwriting recording, which is a great advantage to phase change optical disks, was found. The problem is that the erasability in overwriting operation (called overwrite erasability hereafter) is lower than the erasability in simple erasing by irradiation with an unmodulated laser beam (called DC erasability hereafter) (Nishiuchi et al. Symposium on OPTICAL Memory 1988, p 39). This paper also suggested that the cause of this problem may be due to the fact that the shape of a mark newly recorded by overwriting is distorted through the influence of an old mark recorded before the rewriting. Later studies found that one of the greatest causes of this distortion is the fact that thermal characteristics are different between the amorphous part of a recorded mark and its surrounding crystal part. The crystal part requires absorption of energy equivalent to its latent heat in melting, while the amorphous part does not require absorption of such energy. Therefore, if the same degree of light absorption occurs in the amorphous and crystal parts, the temperature of the amorphous part becomes higher than the crystal part. As a result, if a new amorphous recording is formed on an old amorphous mark having some overlappling part with the old recording mark, then a larger amorphous mark is formed in the overlaping amorphous part than in the part that was an unrecorded crystal part. In short, information of old recording marks remain as a distortions in the shapes of new recorded marks, and the distortions seem to be detected as an residual signal. Recently we reported that, in order to completely eliminate the influence of latent heat, at least 5 percent of $\Delta A$ (which will be defined later) is necessary (Yamada et al. Symposium on OPTICAL Memory 1992, p21).

Concerning the above task, we indicated, in JP-A-Hei 1-149238 (EPC SN 88,120,172.7, U.S. Ser. No. 07/276,630), a recording medium in which the light absorption rate A(amo) of a recorded-mark part of the amorphous state and the light absorption rate of an unrecorded part of the crystal state are made equal and a recording medium in which the light absorption rate of the above crystal part is greater than the light absorption rate of the above amorphous part, and we indicated that these media improve the overwrite erasability.

As shown in FIG. 10, we prepared an optical disk medium such that a recording layer 2 inserted between two dielectric layers 3 is stacked over a smooth substrate 1, and a light reflecting layer 4 and a protection layer 5 for covering the same are deposited on top of the three layers. We indicated that the above condition on the light absorption rate $A(amo) \geq A(cry)$ is satisfied by mainly choosing the thickness of the dielectric layers, and the overwrite erasability on this medium is improved compared with prior optical disks such that $A(cry) < A(amo)$. Here the light absorption rate means the quantity of the light absorbed by the recording layer per unit quantity of the incident light, not the physical light absorption coefficient.

Although this method was an epoch-making proposal for improving the overwrite erasability, another problem was left behind. That is the fact that if the difference $\Delta A = A(cry) - A(amo)$ is made larger, the difference $\Delta R = R(cry) - R(amo)$ of the reflectances between the crystal and the amorphous parts becomes smaller.

FIG. 11 shows a graphical representation of a result obtained from embodiments described in JP-A-Hei 1-149238. As shown in FIG. 11, if the difference $\Delta A$ of the light absorption rates are increased to improve the erasability in the recording medium of JP-A-Hei 1-149238, then the difference $\Delta R$ of the reflectances decreases in one direction. Therefore, in this medium, the overwrite erasability and the signal amplitude conflict with each other, and it is hard to increase both values at the same time.

Moreover, if $\Delta A > 0$ in the media of the embodiments described in JP-A-Hei 1-149238, the absolute amounts of $\Delta R$ are not large. While large $\Delta R = 19.1\%$ and $\Delta R = 16.4\%$ were obtained from medium No. 1 having $\Delta A = -7.4\%$ and medium No. 4 having $\Delta A = -4\%$ respectively, small $\Delta R = 9.7\%$ and $\Delta R = 11.2\%$ were obtained from medium No. 3 having $\Delta A = 5\%$ and medium No. 6 having $\Delta A = 4.1\%$ respectively. Therefore, small reflectance changes, about 50 to 70% of reflectance changes in media having negative $\Delta A$, were obtained from the media having positive $\Delta A$. In particular, medium No. 3 having the recording layer 40 nm thick had the least reflectance, which was less than 10%. And it was expected that if we tried to increase $\Delta A$ more, $\Delta R$ would have decreased further.

Since the reflectance change $\Delta R$ is a great factor that determines the signal intensity, basically C/N (Carrier-to-noise ratio) decreases as $\Delta R$ becomes smaller as shown in FIG. 12. Also, even if $\Delta R$ is the same, the C/N decreases as the recording frequency becomes higher, so that the mark pitch becomes finer. It should be remembered that in JP-A-Hei 1-149238 a large C/N of more than 50 dB is obtained when the recorded-mark pitch is over 2 $\mu$m (the value calculated from linear velocity 15 m/s and recording frequency 7 MHz). In this mark pitch condition the size (1 $\mu$m long if the duty is 50%) of a recorded mark becomes sufficiently large compared with the size (0.9 $\mu$m in diameter in half-width) of a laser spot. Therefore, even if $\Delta R$ is not so large, a large change in the quantity of light is detected as a size effect, ie. as an integrated value. However, the situation changes when the mark pitch is made finer and recording density is made higher as is currently developed. In this case, the size of a recorded mark (0.65 $\mu$m in the present embodiments) becomes equal to or less than the size (0.9 $\mu$m in diameter in half-width in the present embodiments) of a laser spot. Then, if $\Delta R$ is small, only a small change in the quantity of the reflected light is detected, and a decrease of $\Delta R$ has a direct effect of a greatly decreasing C/N. Therefore, if we try to record a signal on an optical disk described in JP-A-Hei 1-149238 at recording density exceeding the one indicated in its description, the C/N decreases inevitably (a detailed description is given later). Under the condition of high-density recording, even the method of JP-A-Hei 1-149238 could not satisfy both a high overwriting C/N and a high overwriting erasability at the same time. In fact, a method of realizing $A(cry) > A(amo)$ and an equivalent value of $\Delta R$ as in a structure in which $A(cry) < A(amo)$, eg. over 15%, and a medium that realizes these conditions have not been indicated. Nor has been indicated a method of constructing a medium that realizes a larger $\Delta A$, eg. over 10%, while $\Delta R$ is about 10%.

A similar prior proposal tried to equalize light absorption by the crystal and amorphous parts (JP-A-Hei 3-113844). This proposal indicated a medium comprising three layers without a reflecting layer and having a thick recording layer of 80 nm (See JP-A-Hei 3-113844, p. 3, Table 1). However, this prior art was not concerned with a medium having another layer (ie. a reflecting layer) that absorbs light. Considering the fact that light absorption by the recording layer and by the reflecting layer can not be measured separately, this prior example is totally indifferent to the structure of a medium having a reflecting layer.

Further, in the above prior patent JP-A-Hei 3-113844, $\Delta A$ is at most 2.1%, and no prospect is shown for obtaining a greater value of $\Delta A$. $\Delta A$ and $\Delta R$ are in a conflicting relation in this prior art, and table 2 of its specification shows that as $\Delta A$ changes from $-14\%$ to $+2.1\%$, $\Delta R$ sharply declines from 30.3% to 15.7% by about 50%. Therefore, a further attempt to increase $\Delta A$ will result in a further decline of $\Delta A$. Thus, if $\Delta A > 0$, this prior art does not obtain a value of $\Delta R$ equivalent to a value in case $\Delta A < 0$. In other words, it can not raise $\Delta A$ beyond 2.1% while retaining $\Delta R$ at 15% or more.

The distortion in overwriting described above brings a more serious problem in mark-edge detection recording (PWM recording) than in prior PPM recording that detects the peak position of a mark. If the shape of a recorded mark is slightly distorted in PPM recording, detection errors rarely occur because a peak position of a playback signal hardly changes. But a distorted shape of a recorded mark directly brings a detection error in PWM recording because the starting and terminal positions of the mark are detected as a signal. Therefore, if PWM recording is adopted, a medium and a recording method that produce less distortion are necessary.

SUMMARY OF THE INVENTION

The object of the present invention is therefore to provide an optical recording medium that gives a high C/N and an erasability even in overwriting a high-density signal such that the size of a recorded mark is near the size of a laser spot and an optical recording medium that hardly produces distortion and applies to PWM recording. More specifically, the object is to produce a recording medium and propose a method of designing its structure such that the difference $\Delta R = R(cry) - R(amo)$, ie. the difference of its reflectances before recording (the crystal state) and after recording (the amorphous state), is at least 15%, and the difference $\Delta A = A(cry) - A(amo)$, ie. the difference of the light absorption rates of its recording layer before recording (the crystal state) and after recording (the amorphous state), is at least 3% and hopefully at least 5%.

The second object is to provide an optical recording medium and propose a method of designing its structure such that $\Delta R$ is more than 10% and $\Delta A$ is more than 10%.

In order to achieve the aforementioned objectives, one recording medium in accordance with the present invention has the following structure. The optical information recording medium comprises at least four layers laminated on a substrate, the first being a dielectric thin film layer, the second being a recording layer consisting of a thin film of a phase change material that makes a reversible structural change by irradiation with a laser beam of wavelength λ and makes a reversible change of the optical characteristics between the crystal state in which the optical constants (the refractive index and the extinction coefficient) are relatively large and the amorphous state in which the optical constants are relatively small, the third being a second dielectric thin film layer, and the fourth being a light reflecting layer consisting of a metal thin film, the thickness of which is chosen so that its reflectivity is less than 60%, preferably less than 50% when measured in a state sandwiched between the dielectric layer and resin layer. The thin films of these layers are determined as follows.

First, the optical constants of each layer under the wavelength of the laser beam used in recording and playback are determined by experiments. Preferably, the optical constants are measured by forming each layer on a substrate whose optical characteristics are clear such as made of glass and by observing its film thickness, transmittance, and reflectance with a step measurement meter, a spectrometer etc. and calculating the optical constants that satisfy these measurements. Alternatively, the optical constants are measured with an ellipsometer.

Second, by assuming the thickness d0 of the recording layer and the thickness d4 of the reflecting layer to be fixed values and by independently varying the thickness d1 of the first dielectric layer and the thickness d2 of the second dielectric layer, the quantity ratios of the reflected light and of the absorbed light to the incident light are calculated by means of a matrix method. By calculating these ratios for the two conditions of the amorphous and crystal states in which the recording film is, the changes of quantity in the reflected light and in the absorbed light before and after recording are calculated. Then the combinations of d1 and d2 that satisfy the condition of one of the above objectives are extracted.

Preferably, both d1 and d2 take their values from 0 to $\lambda/(2n)$, where n is the refractive index, varying at equal intervals of e.g. length $\lambda/(64n)$, and the quantities of the reflected light and the absorbed light are calculated and mapped in the two conditions. In this way results under exhaustive optical conditions are obtained.

As shown in FIG. 1, the light I incident on the above optical information recording medium comprising the four layers is divided by its traces into approximately four parts, ie. part (A) that is absorbed by the recording layer, part (L) that is absorbed by the reflecting layer and changed into heat, part (R) that is reflected on the surface of the medium, and part (T) that transmits through the medium. Therefore, if the quantity rates of these parts are respectively expressed as A(amo), L(amo), R(amo), and T(amo) in the amorphous state and as A(cry), L(cry), R(cry), and T(cry) in the crystal state, then the light absorption rates A(amo) and A(cry) in the amorphous and crystal states are expressed as $$A(amo) = 1 - [L(amo) + R(amo) + T(amo)]$$

$$A(cry) = 1 - [L(cry) + R(cry) + T(cry)]$$

Therefore the difference $\Delta A$ of the light absorption rates are $$\Delta A = A(cry) - A(amo) = [R(amo) - R(cry)] + [L(amo) - L(cry)] + [T(amo) - T(cry)]$$

If $\Delta L$, $\Delta T$, and $\Delta R$ are defined as $$\Delta L = L(amo) - L(cry)$$

$$\Delta T = T(amo) - T(cry)$$

$$\Delta R = R(cry) - R(amo)$$

then $$\Delta A = \Delta L + \Delta T - \Delta R \qquad (1)$$

Therefore, in order to obtain e.g. $\Delta R \geq 15\%$ and $\Delta A \geq 5\%$, it is concluded from the above formula (1) that the total of the first term, ie. the difference of the absorption rates of the reflecting layer, and the second term, ie. the difference of the transmittances should be at least 20% ($\Delta L + \Delta T \geq 20\%$). Similarly, the same percentage of the total is needed in order to obtainer $\Delta R \geq 10\%$ and $\Delta A \geq 10\%$.

The present invention satisfies the above equation (1) or (2) preferably by constructing the reflecting layer less than 15 nm thick from Au. If the reflecting layer is made too thick for light to transmit it, the quantity of the light that transmits the medium becomes very small regardless of the recording layer's state, amorphous or crystal, and the transmittances T(amo), T(cry) and their difference $\Delta T$ approach 0. Also, since the reflectance of Au is large, absorption by the reflecting layer becomes less than 10%, and $\Delta L$ obviously becomes less than it. Therefore, if the reflecting layer is made thicker to increase the absorption rate of the recording layer, it follows that $\Delta A \approx -\Delta R$ from formula (1). In this case, light absorption by the amorphous part is less than light absorption by the crystal part, if there is a change in the reflectance, and the objectives of the present invention can not be achieved. Optical reflectance of the reflecting layer varies depending on the kind of materials at both sides thereof. If an Au layer as a reflecting layer is sandwiched by dielectric layer and resin layer, the reflectivity from the dielectric layer side can be suppressed less than 50% by choosing the thickness of the Au layer less than 18 nm (See FIG. 9(a)). If the resin layer is substituted for air layer, the thickness of the Au layer should be less than 15 nm (See FIG. 9(b)). By making the thickness of the Au reflecting layer thinner, for example, less than 15 nm and making its transmittance sufficiently large when the recording layer is in the amorphous state, the above objectives are achieved with sufficiently large allowable error on the film thickness. Au is chemically far stable than other metals, and there is no danger of corrosion and the like even to its micro-thin film less than 15 nm thick. Moreover, since the thermal conductivity of Au is large, there is an advantage in that even its thin film functions as a heat sink.

If it is necessary for the reflecting layer to be thicker than that of Au, it is preferable to use a material having a comparatively small reflectance and a large light absorption rate such as an Al—Cr alloy or a Ni—Cr alloy. In this case, the light absorption rate of the reflecting layer at the time when the recording layer is in the amorphous state is greater than when the recording layer is in the crystal state, and $\Delta L$ is far larger than the case where a Au reflecting layer is used. Therefore, it follows from formula (1) that $\Delta A$ can be made positive even if $\Delta T$ is less than a few percent.

Another optical information recording medium in accordance with the present invention comprises three layers laminated on a substrate, the first being a dielectric thin film layer, the second being a recording layer consisting of a thin film of a phase change material that makes a reversible structural change by irradiation with a laser beam of wavelength $\lambda$ and makes a reversible change of the optical characteristics between the crystal state in which the optical constants (the refractive index and the extinction coefficient) are relatively large and the amorphous state in which the optical constants are relatively small, and the third being a second dielectric thin film layer. Here the upper limit of the thickness of the recording layer is first determined by the change $\Delta T$ in the transmittance, and the actual thickness d0 of the recording layer is assumed within this limit. Then the thicknesses d1 and d2 of the first and the second dielectric layers are determined. The method of the determination is the same as the case where a reflecting layer is added: The thickness d1 of the first dielectric layer and the thickness d2 of the second dielectric layer are independently varied, and the quantity ratios of the reflected light and of the absorbed light to the incident light are calculated by means of a matrix method for the two conditions of the amorphous and the crystal states in which the recording film is. Then the combinations of d1 and d2 that satisfy the condition of one of the above objectives are extracted.

In this case, since the part (L) that is absorbed by the reflecting layer and changed into heat does not exist, the formula (1) becomes $$\Delta A = \Delta T - \Delta R$$

Here, if the recording layer becomes too thick, then a large part of the incident light is either absorbed by the recording layer or reflected on the surface of the medium regardless of the state of the recording layer. Therefore, $\Delta T$ of the above formula approaches 0, and it follows that $\Delta A \approx -\Delta R$ ($<0$), so that the objectives of the present invention can not be achieved. Therefore, in order to obtain a sufficiently large amount of the change $\Delta A$ in the absorption rate and the change $\Delta R$ in the reflectance, e.g. $\Delta A \geq 5\%$ and $\Delta R \geq 15\%$, or $\Delta A \geq 10\%$ and $\Delta R \geq 10\%$, the thickness of the recording layer should be chosen to be less than the one such that the change $\Delta T$ in the transmittance is over 20%. Here, the change in the transmittance is, strictly speaking, defined as the difference $\Delta T0 = T0(amo) - T0(cry)$, where T0 denotes the transmittance of the medium under the condition that the recording layer is inserted between the two dielectric layers, ie. the light incident on the first dielectric layer passes through the recording layer and emerges into the second dielectric layer.

By means of the above structure, both $\Delta A$ and $\Delta R$ can be obtained in large amounts, and recording media having large CN ratios and high erasabilities and methods of designing them are realized.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 shows a diagram of the design principle for the multilayer structures of optical information recording media in accordance with the present invention.

FIGS. 7(a), 7(b), 7(c), 7(d), 7(e), 7(f), 7(g) and 7(h) show the results of structural calculation for optical information recording media in accordance with the present invention, respectively;

FIG. 12 shows the relation between the difference $\Delta R$ of the reflectances and the CN ratio in the recording medium described in the embodiment of the prior patent.

DETAILED DESCRIPTION OF THE PREFERRED EMBODIMENTS

The preferred embodiments according to the present invention will be described below with reference to the attached drawings.

Figure 1:
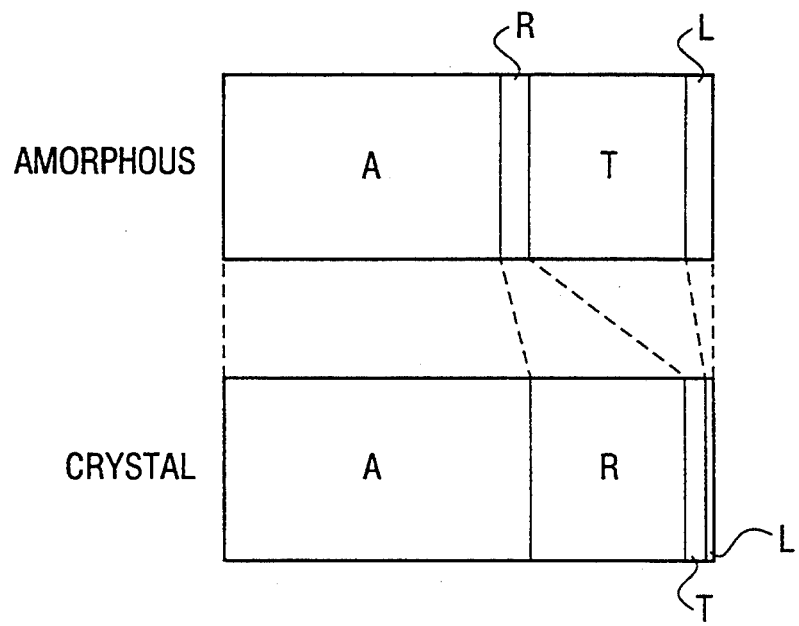
FIG. 1 shows the ratios of the reflected, transmitted and absorbed parts of the incident light in a optical information recording medium having a multilayer structure.
Figure 3:
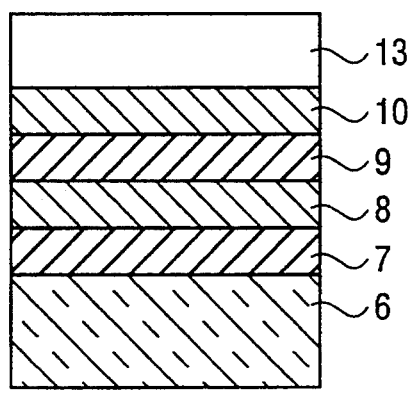
FIG. 3 shows the structure of another embodiment of optical information recording media in accordance with the present invention.
Figure 4:
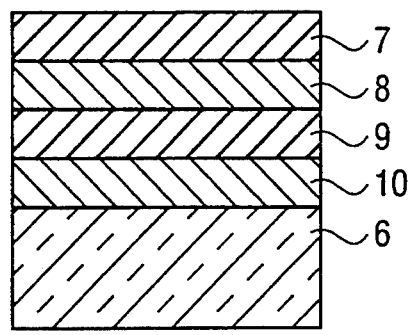
FIG. 4 shows the structure of another embodiment of optical information recording media in accordance with the present invention.
Figure 2A:
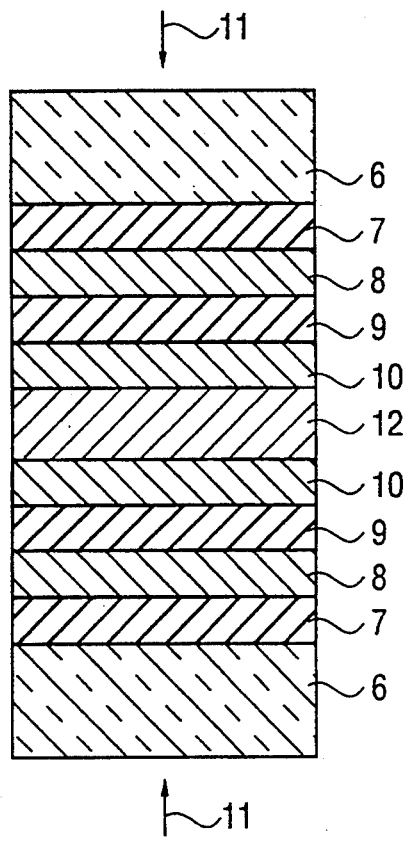
FIGS. 2(a) and 2(b) show the structures of embodiments of the optical information recording media in accordance with the present invention, respectively.
Figure 2B:
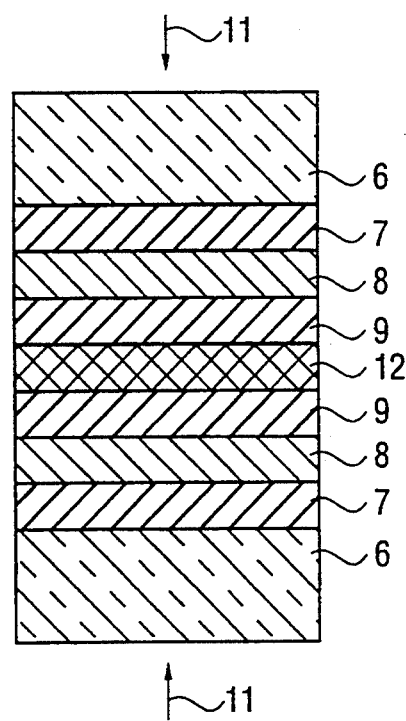

A typical optical information recording medium of the present invention is constructed, as shown in FIG. 2(a), by laminating four layers on a transparent substrate 6, the first being a first dielectric thin film layer 7, the second being a recording layer 8 consisting of a thin film of a phase change material that, by irradiation with a laser beam of wavelength $\lambda$, makes a reversible change of the optical characteristics between the crystal state in which the optical constants (the refractive index n and the extinction coefficient k) are relatively large and the amorphous state in which the optical constants are relatively small, the third being a second dielectric thin film layer 9, and the fourth being a light reflecting layer 10 made of a metal. For recording and playback, a laser beam 11 is made incident on the medium from the side of the substrate. In FIG. 2(b), a structure without a reflecting layer is also shown. In FIGS. 2(a) and 2(b), two sheets of the recording medium are bonded together so that the upper and lower sheets are symmetric with respect to a hot-melt-type adhesive layer 12. In place of pasting, a single-sheet structure having a protecting layer 13 made of UV resin or the like on top of reflecting layer 10 is possible as shown in FIG. 3. It is also possible that reflecting layer 10, second dielectric layer 9, recording layer 8, and first dielectric layer 7 are laminated on a substrate 6 in this order, and light is made incident on the medium from the side of first dielectric layer 1, as shown in FIG. 4. Structures without reflecting layer 10 in FIGS. 3 and 4 are also possible.

In the optical information recording media of the present invention, a whole medium is changed into the crystal state before recording. This pre-crystallization is made by successively crystallizing the medium by irradiating a revolving disk with a laser beam of large power such as an Ar gas laser and by making the light spots larger than the ones used in ordinary signal recording by means of a lens system. Among methods of pre-crystallizing a whole disk simultaneously, there are a method of using a flash lamp having a reflecting mirror that homogenizes the irradiation power and a method of heating a whole medium beyond the crystallizing temperature in an oven.

In order to record a signal in the above precrystallized medium, a laser beam of wavelength $\lambda$ is focused onto the surface of the recording film, and irradiation of pre-determined pulse duration is performed with a power as strong as the recording layer is melted, so that the recording layer is rapidly cooled from the liquid phase and crystallized. In order to crystallize the amorphous part, irradiation of pre-determined pulse duration is performed with a power as strong as the amorphous marked part is heated just beyond the crystallizing temperature (a power lower than the one used in amorphizing), so that the amorphous part is annealed and crystallized. In an optical information recording media of the present invention, R(amo) and A(amo) respectively denote the reflectance (the ratio of the quantity of the reflected light to the quantity of the incident light) of the amorphous mark part of the medium and the light absorption rate of the recording layer in the amorphous state. Similarly R(cry) and A(cry) respectively denote the reflectance of the crystal part and the light absorption rate of the recording layer in the crystal state. Then the recording medium is characterized by the fact that the materials and the thicknesses of its layers are chosen in such a way as to satisfy $$\Delta R = R(cry) - R(amo) \geq 15\%$$

$$\Delta A = A(cry) - A(amo) \geq 5\% \qquad (A)$$

or $$\Delta R = R(cry) - R(amo) \geq 10\%$$

$$\Delta A = A(cry) - A(amo) \geq 10\% \qquad (B)$$

In order to melt the crystal part, more energy equivalent to its latent heat is necessary than to melt the amorphous part. However, by making $\Delta A \geq 5\%$, even if the laser irradiation is performed with the same power on both the crystal and amorphous parts, the absorption by the crystal part is relatively large and can compensate for the difference of the latent heat of fusion, ie. the temperatures of both parts become the same. As a result, distortion in the shape of a mark in overwriting disappears. Also, by securing $\Delta R \geq 15\%$, recording of a signal having a large size is achieved. Further, in case $\Delta A \geq 10\%$ is secured, a large erasability is obtained.

In the above embodiment of the optical recording medium, the substrate 6 is a polycarbonate substrate 1.2 mm thick, but a transparent resin plate such as made of PMMA or amorphous polyolefine, or a glass plate can also be used. Also, a metal plate such as made of Al or Cu or an alloy having one of these as its base can be used. However, if an opaque substrate such as a metal substrate is used, the structure shown in FIG. 3 should be applied, and light is made incident from the side of the films. For use as an optical disk, the recording medium has concentric or spiral continuous groove or a sequence of discontinuous pits having a width and a depth of submicron size on its surface. In the present embodiment, a concentric groove 0.6 $\mu$m wide and 50 nm deep is representatively formed at pitch 1.2 um.

Upper and lower dielectric layers 7 and 9 function to suppress heat damage to the surface of substrate 6, when it is made of a resinous material. They also prevent the deformation and evaporation of recording layer 8 of a phase change material by enclosing it between themselves. They are required to have a higher melting point than the resinous material and the recording layer material, be transparent to the laser beam used in recording and playback, and have great hardness and resistance to a flaw. The present embodiment is described about the case where a $ZnS$—$SiO_2$ mixture is used, but oxides such as $SiO_2$, $ZrO_2$, $TiO_2$ and $Ta_2O_5$, nitrides such as BN, $Si_3N_4$, AlN and TiN, sulfides such as ZnS and PbS, carbides such as SiC, fluorides such as $CaF_2$, selenides such as ZnSe, mixtures of these such as $ZnS-SiO_2$ and SiNO, a diamond film, and diamond-like carbon can be used to obtain a similar result.

The thicknesses of dielectric layers 7 and 9 are determined as follows. First the complex indices of refraction of the materials of dielectric layers 7 and 9, recording layer 8, reflecting layer 10, and substrate 6 are obtained. The complex index of refraction of a thin film is usually obtained by forming a film on a glass plate, obtaining its thickness by a step measurement meter, measuring the reflectance and the transmittance for a desired wavelength with a spectrometer, and calculating the complex index of refraction that satisfies these measurements. The present invention used this method, but a method of using an ellipsometer can also be applied.

Next, by fixing the thickness d0 of recording layer 8 and the thickness d4 of reflecting layer 10 at certain values and by independently varying the thickness d1 of dielectric layer 7 and the thickness d2 of dielectric layer 9, the quantity ratios of the reflected light and of the absorbed light to the incident light are calculated by means of a matrix method. By calculating these ratios for the two conditions of the amorphous and crystal states in which the recording film is, the changes of quantity in the reflected light and in the absorbed light before and after recording are calculated. Then the combinations of d1 and d2 that satisfy the objective (A) or (B) described above are extracted. If the refractive index of dielectric layers 7 and 9 is n for light of a wavelength $\lambda$, then the optical characteristics of the multilayer film medium vary periodically with period $\lambda/(2n)$. Therefore if both d1 and d2 take their values from 0 to $\lambda/(2n)$, varying at equal small intervals, and the calculated results are mapped, then the results for the whole range of the optical characteristics are obtained. The method of calculation is described later in detail.

The material used for recording layer 8 is chosen from phase change materials that make the reversible phase change between the amorphous and crystal states by laser irradiation and have a larger refractive index and an extinction coefficient in their amorphous state than in their crystal state. For example, Ge—Sb—Te, Ge—Te, In—Sb—Te, Sb—Te, Ge—Sb—Te—Pd, Ag—Sb—In—Te, Ge—Bi—Sb—Te, Ge—Bi—Te, Ge—Sn—Te, Ge—Sb—Te—Se, Ge—Bi—Te—Se, and Ge—Te—Sn—Au systems or systems composed of one of these systems and additives such as O or N. The present invention does not by its nature limit the composition of the recording layer. Therefore, if a certain representative composition applies to the present invention, another composition composed of that composition and a small amount of additives is also applicable. In the present embodiment, a case where a representative composition $Ge_2Sb_2Te_5$ is used for the recording film is described.

These thin films are in the amorphous state when the films are made, but if they are crystallized by laser irradiation, then their optical density become higher, ie. their optical characteristics become larger. As described above, when these thin films are used as the recording layer, the whole recording film are first crystallized and regarded as being in the unrecorded state. When a laser beam is focused on this film, and the irradiated part is amorphized, then the optical constants change and recording is performed. When playing back the changes, the recording film is scanned by irradiating a laser beam with a weak power that does not make further change on the film, and the recorded information is reproduced by detecting a change in the intensity of the light reflected from the recording film or the light passing through the medium.

In a structure having a reflecting layer 10, the thickness d0 of the recording layer 8 should be chosen to be less than the thickness dmax such that part of the incident light passes through the recording layer 8 at a sufficient intensity to be detected, even if the recording layer 8 is in the crystal state, ie. when its optical density is comparatively high. For example, if the above phase change material film in the crystal state is inserted between dielectric layers (the thicknesses of both upper and lower layers are assumed to be infinite) of the same material as dielectric thin film layers 7 and 9, then the transmittance should be at least 1%, preferably over 2% to 3%, and should be at least 10% of the transmittance at the time when the phase change material film is in the amorphous state. If the component that is reflected from the reflecting layer 10 and incident again on the recording layer 8 becomes small, then effects of the interference of light become small, and the change in the reflectance of the whole medium can not be made large, even if the thickness d2 of the dielectric layer 9 and the thickness d3 of the reflecting layer are changed.

Figure 5:
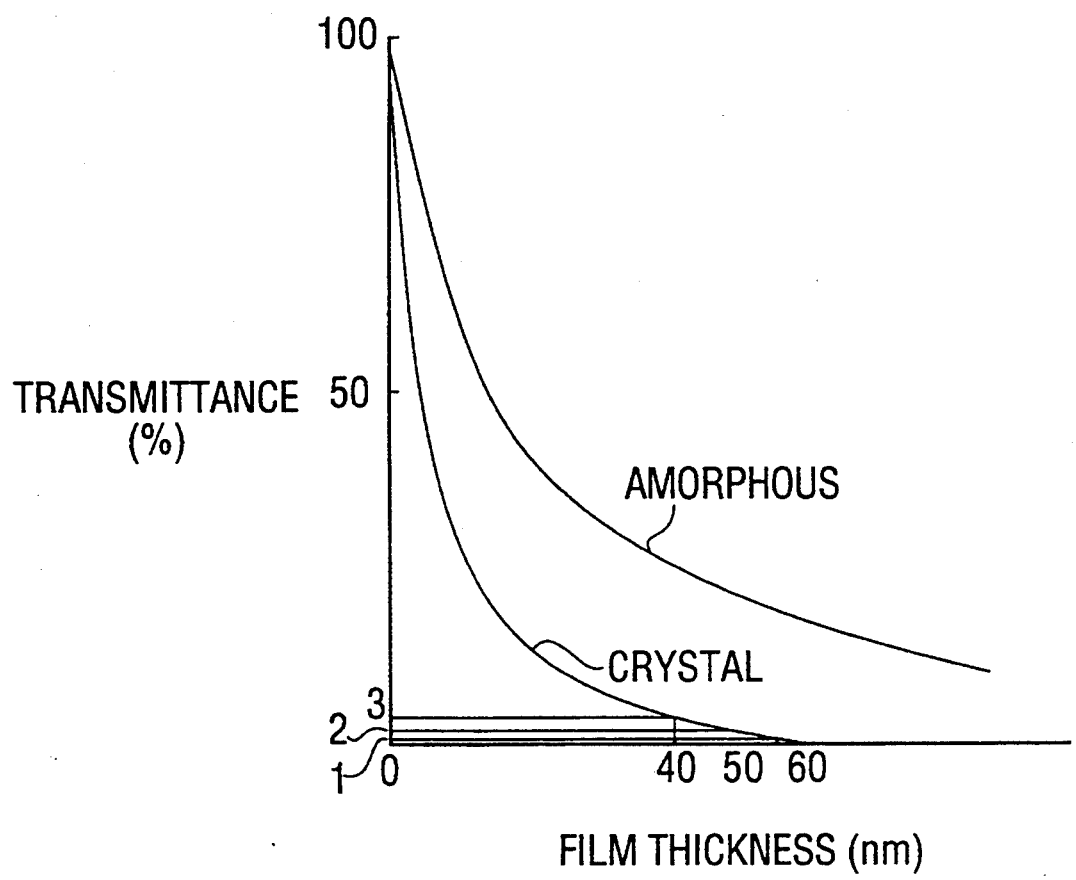
FIG. 5 shows the relation between the thickness of the recording layer and the transmittance of the recording medium of an embodiment in accordance with the present invention.

FIG. 5 shows the relation between the transmittance and the thickness of a representative recording film of $Ge_2Sb_2Te_5$ for wavelength 780 nm, when it is inserted between the films of $ZnS-SiO_2$ mixtures ($SiO_2$: 20 mol %). From this figure, it is observed that if the recording film is in the crystal state, the transmittance is over 1% if the thickness is less than 60 nm, over 2% if the thickness is less than 50 nm, and over 3% if the thickness is less than 40 nm. Therefore, in this case, the maximum thickness dmax is 60 nm and preferably 40 nm.

In case a reflecting layer is not used, the thickness d0 of the recording layer 8 is determined from the transmittance under the condition that the recording layer is inserted between the dielectric layers: If T0(amo) and T0(cry) denote the transmittances respectively at the time when the recording film is in the amorphous state and at the time when it is in the crystal state, then its thickness is chosen within a range such that $\Delta T0 = T0(amo) - T0(cry)$ is more than 20%. In the present invention, the most favorable recording materials among $GeTe-Sb_2Te_3$ pseudo-binary materials are compositions having GeTe ratios of 67 to 33 mol % in particular $Ge_2Sb_2Te_5$, $GeSb_2Te_4$, and $GeSb_4Te_7$ compound compositions, or systems composed of one of these compositions and additives Sb, Bi, Ge, Sb, Co, Pd, etc.. From FIG. 5, it is observed that if a thin film of the representative composition $Ge_2Sb_2Te_5$ is less than 45 nm thick, then $\Delta T0 \geq 20\%$, and if it is less than 25 nm thick, then $\Delta T0 \geq 25\%$. Since materials of the Ge—Sb—Te system have similar optical properties regardless of their composition, the maximum thickness of their films that are within the range of the present invention is considered to be 45 nm.

The reflecting layer 10 is made of a metal thin film. If its thickness is less than 15 nm, it is possible to design a multilayer film structure having a reflecting layer made of Au, Al, Cu, Cr, Ti, Ni, Pd, Pt, or Ag, or an alloy of these metals and satisfying the above objective (A) or (B). The condition for determining the thickness of the reflecting layer 10 is that the transmittance of the whole multilayer structure at the time when the recording layer 8 is in the amorphous state is at least 20% larger than when it is in the crystal state. More simply, the thickness is chosen so that the transmittance is at least 30% when the reflecting layer material is inserted between the layers of the dielectric material and resin material for substrate. As described above, the thickness should be at most 15 nm. If it is more than that, light is hardly passes through the whole medium, and condition (A) or (B) is not satisfied.

One of the best embodiments in accordance with the present invention uses a Au thin film over 3 nm thick and less than 15 nm thick as its reflecting layer. In general, metal is easy to corrode from its surface when it is made thin, but since Au is chemically stable, it has an advantage that there is hardly any danger of corrosion even if it is made very thin. If the thickness of a Au reflecting layer is thicker than 15 nm, the light passing through the reflecting layer almost disappears. Therefore condition (A) or (B) becomes no longer satisfied from the reason described above. The lower limit of the thickness is determined by the capacity of thermal diffusion. Since Au is a material having a large thermal conductivity, it functions as a thermal diffusion layer, even if it is made a thin film less than 15 nm, but it almost ceases to function as a thermal diffusion layer, if it is made thinner than 3 nm. When the Au layer stops its function as a thermal diffusion layer, turbulence in the shape of recorded marks caused by heat accumulation becomes great under the condition that the linear velocity is less than 10 m/s. If the linear velocity is larger than 10 m/s, then heat accumulation is small and a Au layer less than 3 nm thick effectively functions. Therefore, if the recording medium is applied to a recording condition that includes the linear velocity less than 10 m/s, then the thickness of the Au reflecting layer should be between 3 nm and 15 nm.

It is possible to finely adjust the optical constants and thermal conductivity of the reflecting layer 10 by using an alloy composed of Au and additives. Additives are chosen from Al, Cr, Cu, Ge, Co, Ni, Ag, Pt, Pd, Co, Ta, Ti, Bi, Sb, Mo, Si, etc. For example, the addition of Mo or Cr improves the adhesiveness to the dielectric layer 9 and makes it possible to construct a durable medium. In general, the increase of additives in a Au-based alloy rapidly reduces its thermal conductivity. For example, since the adding of Cr greatly reduces the thermal conductivity, Cr-added Au can be effectively used in place of a Au reflecting layer when the recording sensitivity is insufficient. Conversely, if an equivalent thermal diffusivity as Au is necessary, the density of the additives should be at most 15 at %, preferably less than 5 at %. If the density is less than 5 at %, then approximately the same multilayer structure as in using a Au reflecting layer can be adopted.

It is possible to use Al, Cu, Cr, Ti, Ni, Pd, Pt, Ag, or their alloys in place of Au or Au alloys for reflecting layer 10. In particular, since Cu, Al, Ag, etc. have large thermal conductivities, they suit the present invention. However, since these materials are easier to corrode than Au, an additional moisture-proof layer 24 is formed over metallic reflecting layer 10, if their thin films 3 to 15 nm thick are used as in a Au reflecting layer. Alternatively, two sheets of the medium are bonded together with the film-formed side of each sheet being inside. The same material used for dielectric layers 7 and 9 can be used for the moisture-proof layer. Its thickness is required to be at least about 10 nm, preferably over 30 nm.

If a thin film of Al, Ti, Ni, Cr etc. or one of their alloys, Al—Ti, Al—Cr, Al—Ta, Ni—Cr, etc is used for the reflecting layer 10, then even if its thickness is more than 15 nm, and the above transmittance of the medium becomes less than 1%, there exist the thicknesses of dielectric layers 7 and 9 that satisfy condition (A) or (B). The reason is, as described in the Summary of the Invention, that the light absorption rate of the reflecting layer 10 becomes equal or more than the transmittance of the whole medium, if one of these materials is used for the reflecting layer 10. However, as the reflecting layer becomes thicker, the range of thicknesses of the dielectric layers become narrower. If at least one of Au, Cr, Cu, Ge, Co, Ni, Ag, Pt, Pd, Co, Ta, Ti, Bi, Sb, Mo, etc. are added to an Al layer, its chemical stability, thermal conductivity, optical constants and the like can be finely adjusted. For example, it is known that if Cr or Ta is added, the reflectance is slightly reduced, but durability increases. Therefore, Al with an additive Cr or Ta is suitable for a reflecting layer of an optical disk.

The thicknesses of first and second dielectric layers 7 and 9 are determined as follows. The first step determines the optical constants of each layer of the whole medium. The value of the refractive index of a glass substrate or resin substrate is usually obtained from already known results. However, the refractive indices of the thin films are often unknown unless they are obtained from observation. The refractive index of each film of dielectric layers 7 and 9, recording layer 8, and reflecting layer 10 can be calculated from measurements of its thickness, reflectance and transmittance. If the values of the refractive index n and the extinction coefficient k of a thin film are known, then its reflectance and transmittance are easily calculated. Therefore, the values of the optical constants n and k of a thin film is obtained by independently varying the values of n and k from 0 to 10 at intervals of length 0.01, calculating the values of the reflectance and extinction coefficient for each of these values of n and k, comparing the calculated results with observed values, and selecting the values of n and k that give the greatest agreement. A sample of a quartz glass substrate 1.2 mm thick having known refractive index 1.46 with a film about 50 nm thick deposited on it is prepared for measurement. The thickness of the film can be obtained by scratching part of the film with a metal needle and measuring the depth of the formed groove with a step measument meter. The reflectance and transmittance of the film can be measured with a spectrometer. In case of a recording layer, the optical constants should be obtained in both the amorphous and crystal states. Since a recording layer is usually formed in the amorphous state, a sample in the crystal state can be obtained by keeping the sample in an Ar gas atmosphere at a temperature above the crystallizing temperature for 10 minutes.

The second step determines the thickness of each layer in order to obtain necessary properties, specifically condition (A) or (B), for an erasable optical information recording medium. If the optical constants and thickness of each layer is known, the reflectance of the medium, the absorption rate of the recording layer, and the absorption rate of the reflecting layer can be calculated using a matrix method (See, e.g. Kubota, Hiroshi *Wave Optics*, Ch 3, Tokyo: Iwanami, 1971, in Japanese, or Levi, Leo *Applied Optics* II, p 67–72, New York: John Wiley, 1968). The present embodiment first fixes the thicknesses of recording layer 8 and reflecting layer 10 at certain values. Then the thicknesses of both first and second dielectric layers 7 and 9 are varied from 0 to $\lambda/(2n)$ at intervals of length $\lambda/(64n)$, where $\lambda$ is the wavelength of the light, and n is the refractive index of dielectric layers 7 and 9. Then the ratios of the part of the incident light absorbed by the recording layer 8, the part absorbed by the reflecting layer 10, and the part reflected from the medium are obtained under the two conditions where the recording layer 8 is in the amorphous state and in the crystal state, and the range of the thicknesses that satisfy the predetermined condition (A) or (B) for $\Delta A$ and $\Delta R$ is obtained.

FIG. 6 shows a diagram of the relation between a multilayer recording medium and the electric field strength caused by the light passing through it. The m layers including the substrate is numbered from 1 to m, and the light of wavelength $\lambda$ is made incident from layer 1 at right angles. In case of an optical disk, since recording and playback are performed at the beam waist part of the light emerging from the object lens, it is possible to assume that the incident light is perpendicular to the surface of the medium. The complex index of refraction and the thickness of layer j are respectively denoted by $n^*_j$ and $d_j$. Then $$n^*_j = n_j + i\, k_j$$

where $n_j$ the refractive index of layer j, $k_j$ is the extinction coefficient of layer j, and i is the imaginary unit such that $i^2 = -1$. Since there is no light absorption in layers 1 and m, $$K_1 = 0,\ k_m = 0$$

$E^+_j$ denotes the electric field strength at the boundary between layer j and layer $j+1$ caused by the light passing from layer j to the boundary, and $E^-_j$ denotes the electric field strength at the boundary between layer j and layer $j+1$ caused by the light passing from layer $j+1$ to the boundary. Also, at the boundary between layer $m-1$ and layer m, ie. between the reflecting layer and the adhesive layer, the electric field strength caused by the light passing from the boundary to layer m is denoted by $E^+_m$, and the electric field strength caused by the light passing from layer m to the boundary is denoted by $E^-_m$. Therefore, in FIG. 6, $E^+_1$, $E^-_1$, and $E^+_m$ respectively denote the electric field strength caused by the incident light, the reflective light, the transmitted light. Here it is assumed that there is no light incident from the opposite side of the multilayer recording medium, and $E^-_m = 0$.

During the light is passing through each layer j from a boundary to the next boundary, the change of the electric field strength is determined by the complex index of refraction $n^*_j$ and the thickness $d_j$ of the layer j. Specifically, it is changed by the factor $\exp[i\delta_j]$; the factor is $\exp[-i\delta_j]$ if the direction is opposite. Here $$\delta_j = (2\pi/\lambda) n^*_j d_j = (2\pi/\lambda)(n_j + i\, k_j) d_j$$

Therefore $$\exp[i\delta_j] = \exp[i(2\pi/\lambda) n_j d_j] \cdot \exp[-(2\pi/\lambda) k_j d_j]$$

Here the first factor expresses the argument of the complex value $\exp[i\delta_j]$ and the second factor expresses its absolute value. Therefore, the first factor shows the change of phase, and the second factor shows the extinction in the electric field strength; and $\alpha = 2\pi k_j / \lambda$ is the physical extinction coefficient.

Therefore, at the boundary between the layer $j-1$ and the layer j, the electric field strength caused by the light passing from the boundary to the layer j is $E^+_j \cdot \exp[-i\delta_j]$, and the electric field strength caused by the light passing from the layer j to the boundary is $E^-_j \cdot \exp[i\delta_j]$.

Since the electric field is continuous at the boundary between the layer $j-1$ and the layer j, it follows, by the law of conservation of energy, that $$E^+_{j-1} + E^-_{j-1} = E^+_j \exp[-i\delta_j] + E^-_j \exp[i\delta_j] \qquad (2)$$

Since the law of conservation of energy can be applied to the corresponding magnetic field strengths, it follows similarly that $$H^+_{j-1} + H^-_{j-1} = H^+_j \exp[-i\delta_j] + H^-_j \exp[i\delta_j] \qquad (3)$$

From the relation between the electric field and the magnetic field in an electromagnetic wave, we have $$\vec{H_j} = n^*_j \vec{Z} \times \vec{E_j} \qquad (C)$$

where Z denotes the unit vector in the direction of the incident light and $\times$ denotes the vector product. Therefore, it follows from (3) that $$n^*_{j-1} E^+_{j-1} - n^*_{j-1} E^-_{j-1} = n^*_j E^+_j \exp[-i\delta_j] - n^*_j E^-_j \exp[i\delta_j] \qquad (4)$$

By solving $E^+_{j-1}$ and $E^-_{j-1}$ from (2) and (4), it follows $$E^+_{j-1} = [(n^*_{j-1} + n^*_j)/2n^*_{j-1}] \cdot E^+_j \exp[-i\delta_j] + [(n^*_{j-1} - n^*_j)/2n^*_{j-1}] \cdot E^-_j \exp[i\delta_j]$$

$$E^-_{j-1} = [(n^*_{j-1} - n^*_j)/2n^*_{j-1}] \cdot E^+_j \exp[-i\delta_j] + [(n^*_{j-1} + n^*_j)/2n^*_{j-1}] \cdot E^-_j \exp[i\delta_j]$$

In matrix notation $$\begin{pmatrix} E^+_{j-1} \\ E^-_{j-1} \end{pmatrix} = \begin{pmatrix} \dfrac{n^*_{j-1} + n^*_j}{2n^*_{j-1}} \exp[-i\delta_j] & \dfrac{n^*_{j-1} - n^*_j}{2n^*_{j-1}} \exp[i\delta_j] \\ \dfrac{n^*_{j-1} - n^*_j}{2n^*_{j-1}} \exp[-i\delta_j] & \dfrac{n^*_{j-1} + n^*_j}{2n^*_{j-1}} \exp[i\delta_j] \end{pmatrix} \begin{pmatrix} E_j^+ \\ E_j^- \end{pmatrix}$$

$$\begin{pmatrix} E^+_{j-1} \\ E^-_{j-1} \end{pmatrix} = M_j \begin{pmatrix} E_j^+ \\ E_j^- \end{pmatrix}$$

$$M_j \begin{pmatrix} \dfrac{n^*_{j-1} + n^*_j}{2n^*_{j-1}} \exp[-i\delta_j] & \dfrac{n^*_{j-1} - n^*_j}{2n^*_{j-1}} \exp[i\delta_j] \\ \dfrac{n^*_{j-1} - n^*_j}{2n^*_{j-1}} \exp[-i\delta_j] & \dfrac{n^*_{j-1} + n^*_j}{2n^*_{j-1}} \exp[i\delta_j] \end{pmatrix}$$

That is where and $\delta_j = 0$ if $j = m$.
Therefore $$\begin{pmatrix} E_1^+ \\ E_1^- \end{pmatrix} = \prod_{j=2}^{m} M_j \begin{pmatrix} E_m^+ \\ 0 \end{pmatrix} = \begin{pmatrix} m_{11} & m_{12} \\ m_{21} & m_{22} \end{pmatrix} \begin{pmatrix} E_m^+ \\ 0 \end{pmatrix}$$

Therefore, $$E^+{}_1 = m_{11} E^+{}_m \quad (5)$$

ie.

$$E^+{}_m = (1/m_{11}) E^+{}_1 \quad (6)$$

and $$E^-{}_1 = m_{21} E^+{}_m \quad (7)$$

From (6) to (7)

$$E^-{}_1 = (m_{21}/m_{11}) E^+{}_1 \quad (8)$$

Similarly $$H^+{}_1 = m_{11} H^+{}_m \quad (9)$$

ie.

$$H^+{}_m = (1/m_{11}) H^+{}_1 \quad (10)$$

and $$H^-{}_1 = (m_{21}/m_{11}) H^+{}_1 \quad (11)$$

The quantity of light, ie. the amount of light energy is the magnitude of its poynting vector, ie. the vector product of its electric field strength $\vec{E}_j$ and its magnetic field strength $\vec{H}_j (= \vec{E}_j \times n^*_j \vec{Z} \times \vec{E}_j)$. Therefore, if V, W, and X denote the amounts of respectively the incident light, the reflected light, and the transmitted light, then $$V = |E^+{}_1 \times H^+{}_1| = |E^+{}_1|^2 \cdot |n^*{}_1| \quad (12)$$

$$W = |E^-{}_1 \times H^-{}_1| = |E^-{}_1|^2 \cdot |n^*{}_1| \quad (13)$$

$$X = |E^+{}_m \times H^+{}_m| = |E^+{}_m|^2 \cdot |n^*{}_m| \quad (14)$$

Since the transmittance T of the medium is the ratio of the amount of the transmitted light to the amount of the incident light V, and the reflectance R of the medium is the ratio of the amount of the reflected light to the amount of the incident light, it follows from (5) to (14) that $$T = X/V = |E^+{}_m|^2 \cdot |n^*{}_m| / |E^+{}_1|^2 \cdot |n^*{}_1| = |n^*{}_m / n^*{}_1| |1/m_{11}|^2$$

$$R = W/V = |E^-{}_1|^2 \cdot |n^*{}_1| / |E^+{}_1|^2 \cdot |n^*{}_1| = |m_{21}/m_{11}|^2$$

If $R_j$ is defined as $$R_j = \prod_{i=j+1}^{m} M_i$$

then similarly as above $$\begin{pmatrix} E_j^+ \\ E_j^- \end{pmatrix} = R_j \begin{pmatrix} E_m^+ \\ 0 \end{pmatrix} = R_j \cdot \frac{1}{m_{11}} \begin{pmatrix} E_1^+ \\ 0 \end{pmatrix}$$

and $E^+{}_j$ and $E^-{}_j$ can be obtained.

If $A_j$ denotes the quantity absorbed by the layer j, where $2 \leq j \leq m-1$, $A_j$ can be calculated as the decrease of the magnitude of the poynting vector. In particular, if $k_j = 0$, ie. in case the layer j is optically transparent, there is no extinction, and $A_j = 0$. If $k_j \neq 0$, ie. layer j is optically opaque, then $$A_j = |n^*{}_{j-1}| \cdot (|E^+{}_{j-1}|^2 - |E^-{}_{j-1}|^2) - |n^*{}_{j+1}| \cdot (|E^+{}_{j+1} \cdot \exp[-i\delta_{j+1}]|^2 - |E^-{}_{j+1} \cdot \exp[i\delta_{j+1}]|^2)$$

In this embodiment the following measurements were actually obtained by experiments.

Number of layers: m = 5
Wavelength: $\lambda = 0.78$ μm
Complex index of refraction:
Polycarbonate substrate: $n^*{}_1 = 1.58$
ZnS—SiO$_2$ dielectric film: $n^*{}_2 = 2.1$
Ge$_2$Sb$_2$Te$_5$ recording film: $n^*{}_3 = 4.55 + i1.35$ (Amorphous) $n^*{}_3 = 5.57 + i3.38$ (Crystal)
ZnS—SiO$_2$ dielectric film: $n^*{}_4 = 2.1$
Au reflecting layer film: $n^*{}_5 = 0.18 + i4.64$
If the thickness of each layer is designed as
ZnS—SiO$_2$ dielectric film (under-layer): $d_2 = 0.093$ μm
Ge$_2$Sb$_2$Te$_5$ recording film: $d_3 = 0.030$ μm
  In general, it is to be noted that the volume in the amorphous stae is reduced when crystallized. In this case, the thickness of the film was reduced by 4% when crystallized. Thus, the value of the thickness $d_3$ was 0.0288 μm in the crystallized sate.
ZnS—SiO$_2$ dielectric film (over-layer): $d_4 = 0.151$ μm
Au reflecting layer film: $d_5 = 0.0010$ μm
then using these values and the above formulas, the reflectance R(amo) and the light absorption rate A(amo) in case the recording film is in the amorphous state and the reflectance R(cry) and the light absorption rate A(cry) in case the recording film is in the crystal state are calculated. Then the reflectance difference $\Delta R = R(cry) - R(amo)$ and the absorption rate difference $\Delta A = A(cry) - A(amo)$ are calculated. These results are

| R(cry) = 26.1% | R(amo) = 8.7% | $\Delta R$ = 17.4% |
|---|---|---|
| A(cry) = 56.1% | A(amo) = 43.1% | $\Delta A$ = 13.1% |

Therefore, in this condition on the thicknesses of films, the condition (A), ie. $\Delta R \geq 15\%$ and $\Delta A \geq 5\%$, is satisfied.

Figure 7C:
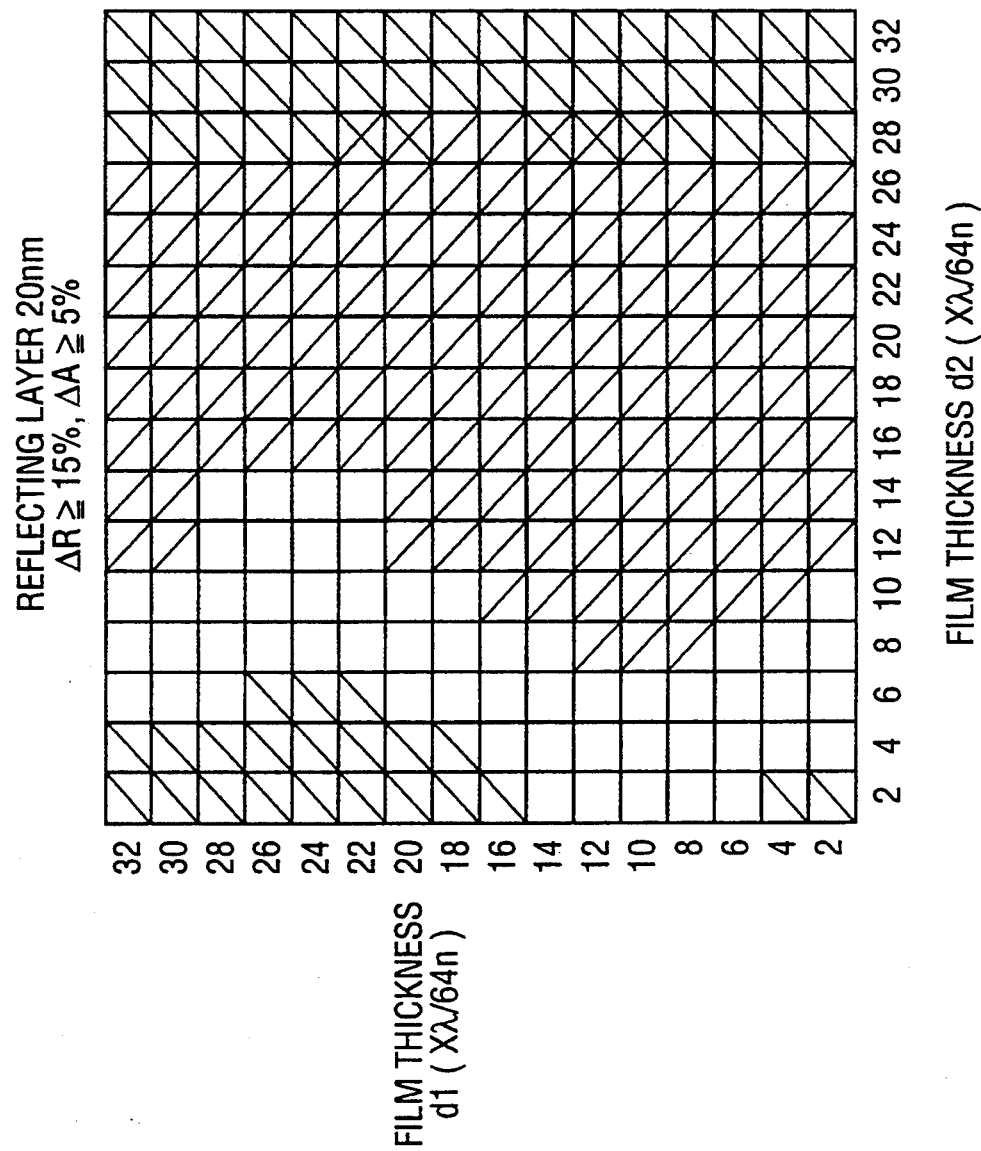
Figure 7F:
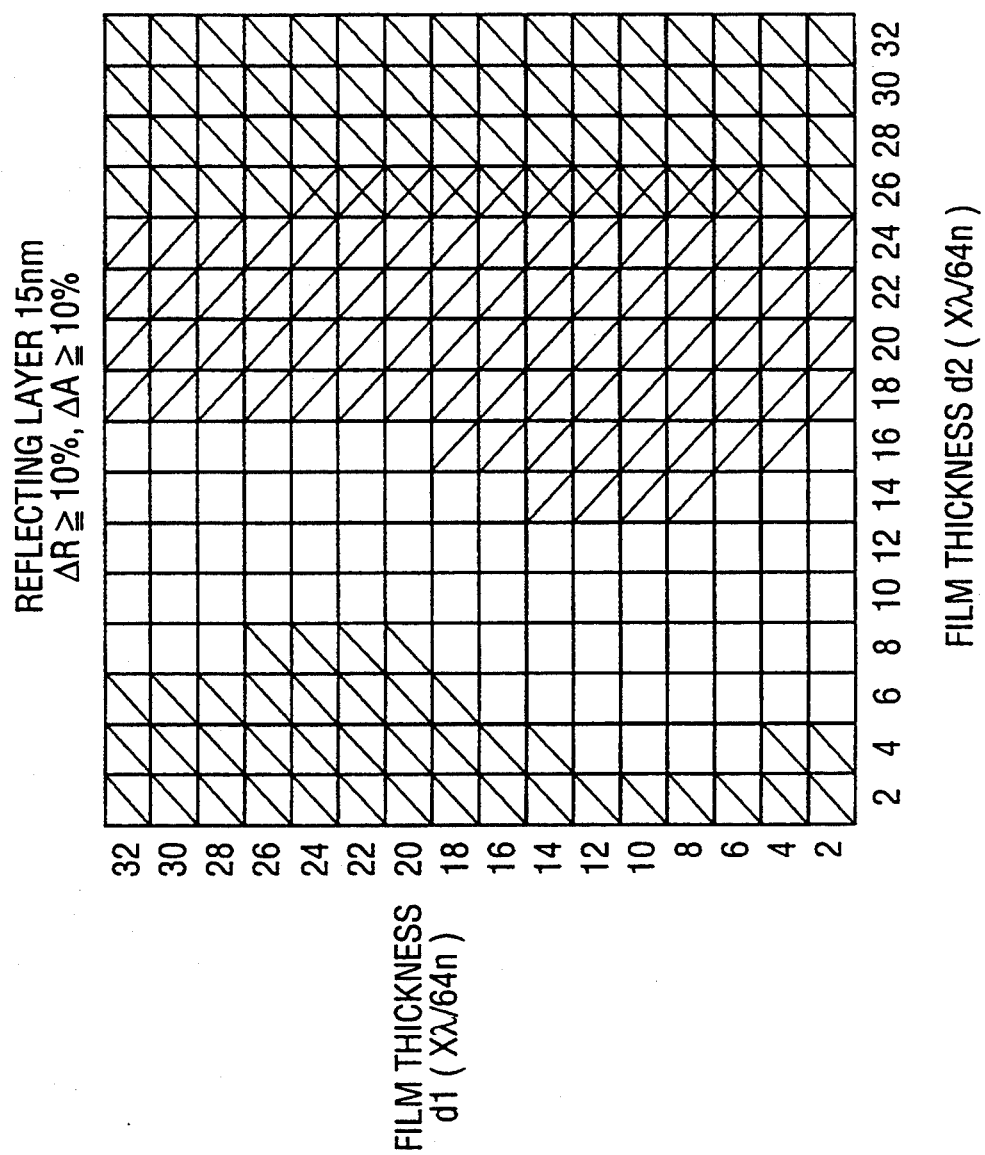
Figure 7G:
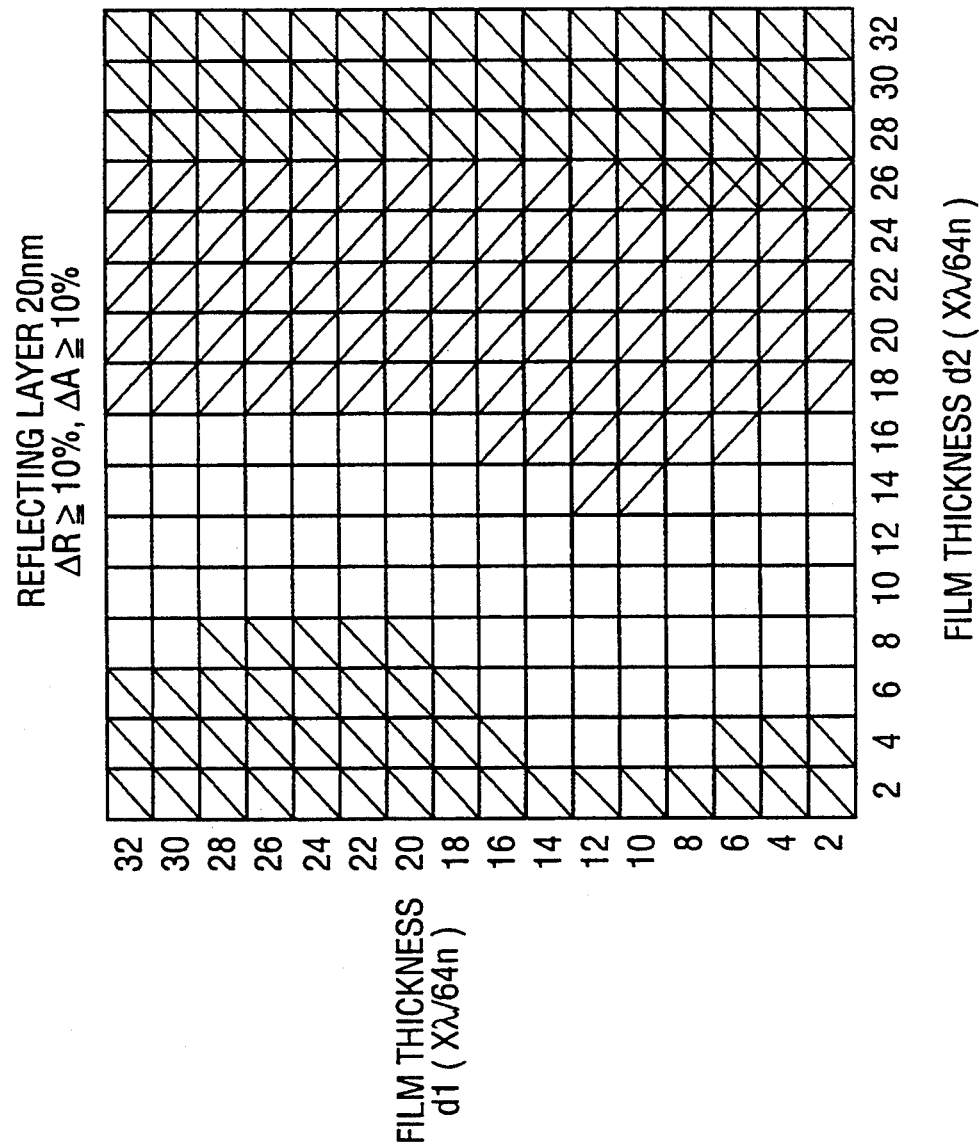
Figure 7H:
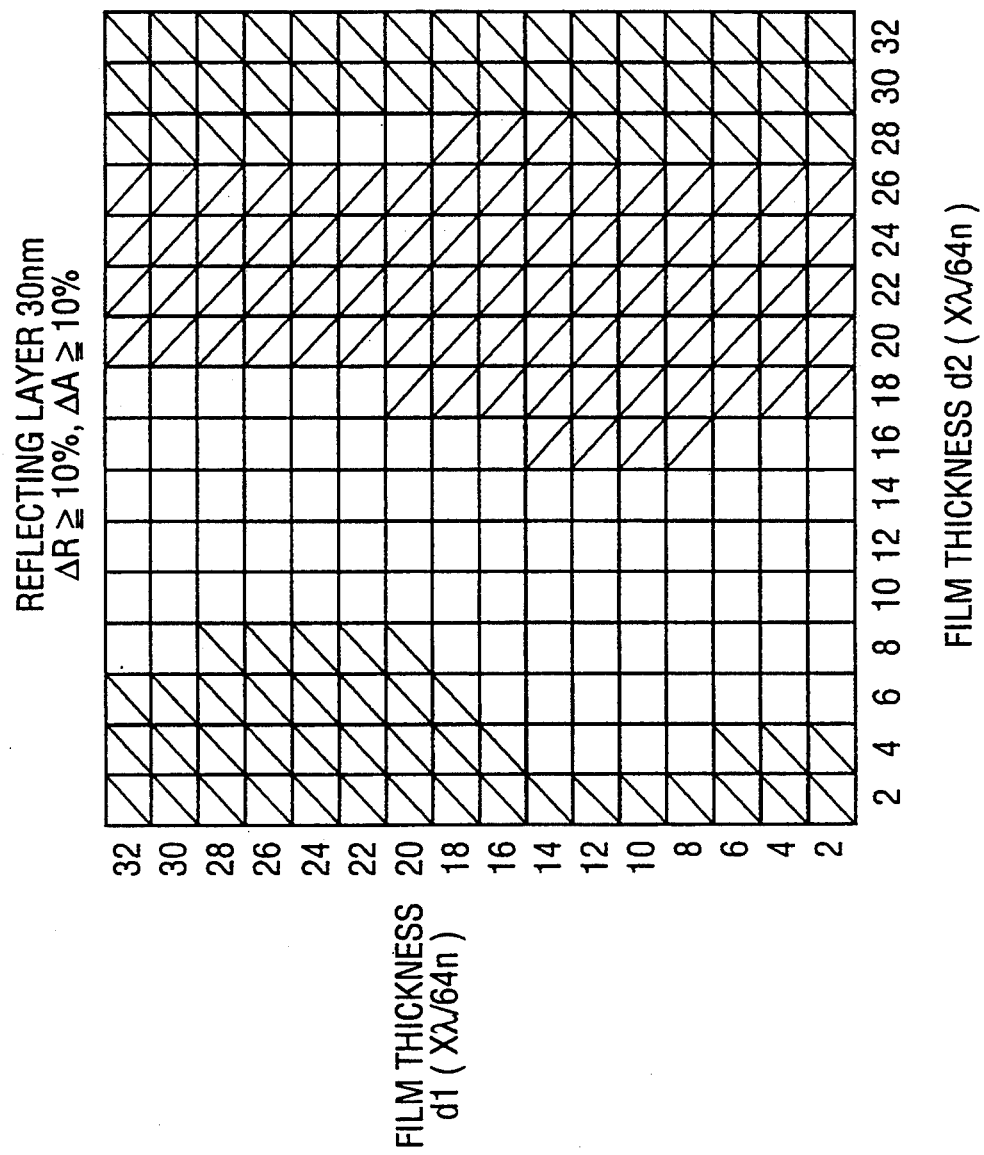

More generally, combinations of thicknesses d1 and d2 of the upper and lower ZnS—SiO$_2$ dielectric layers that satisfy condition (A) can be obtained by performing similar calculation by fixing the thicknesses d0 and d4 of the recording film and the reflecting layer film at the above values, and independently varying the thicknesses d1 and d2 from 0 to $\lambda/(2n)$ at intervals of length $\lambda/(64n)$. FIG. 7(a) shows the obtained results. In addition, FIGS. 7(b), 7(c), 7(d) show the results in case the thicknesses d4 of the reflecting layer are respectively 15 nm, 20 nm, and 30 nm. In these Figures, the diagonals upward to the right show the range where the condition $\Delta R \geq 15\%$ is satisfied, and the diagonals downward to the right show the range where the condition $\Delta A \geq 5\%$ is satisfied. Therefore, the range where the two diagonals cross each other show the combinations of d1 and d2 such that condition (A) is satisfied.

As observed from FIGS. 7(a) to 7(d), if d4 = 10 nm, the region of proper d1 and d2 is centered on d1 = 12$\lambda$/(64 n) and d2 = 28$\lambda$/(64 n) with an allowance over ±5%. If d4 = 15 nm, then the region is centered on d1 = 11$\lambda$/(64 n) and d2 = 27$\lambda$/(64 n) with an allowance over ±3%. As d4 increases, the region shrinks. If d4=20 nm, then the allowance becomes very small, and if d4=30 nm, the region disappears.

FIGS. 7(e), 7(f), 7(g) and 7(h) show the same calculated results for condition (B), ie. $\Delta R \geq 10\%$ and $\Delta A \geq 10\%$. In these Figures, the diagonals upward to the right show the range where the condition $\Delta R \geq 10$ is satisfied, and the diagonals downward to the right show the range where the condition $\Delta A \geq 10\%$ is satisfied. Therefore, the range where the two diagonals cross each other shows the combinations of d1 and d2 such that condition (B) is satisfied. If d4=10 nm, the region of proper d1 and d2 is centered on d1=16λ/n(64 n) and d2=25λ/(64 n) with an allowance over ±3%. If d4=15 nm or d4=20 nm, then the region exists though the allowance is small. However, if d4=20 nm, the thickness of the first dielectric layer d1 becomes small. Therefore, considering the function of a dielectric layer of reducing heat damage to the substrate, this case is unfavorable. If d4=30 nm, there is no combination of d1 and d2 that satisfies condition (B).

How the range of d1 and d2 that satisfies condition (A) or (B) changes can be calculated by varying the thickness d0 of the recording layer from 0 to 60 nm at intervals of length 2 nm and varying the thickness d4 of the recording layer from 0 to 25 nm at intervals of length 1 nm. If d0 is made more than 55 nm, or d4 is made more than 20 nm, then the allowance of d1 and d2 becomes small, and if d0 or d4 is further increased, then the admissible combinations of d1 and d2 disappear. Considering fluctuations during production, the practical thickness of the recording layer should be less than 50 nm, and the practical thickness of the reflecting layer should be less than 15 nm in the present embodiment.

The calculation for the structure without a reflection layer can be made similarly. In this case, the thickness of the reflection layer is made 0 in the above formulas. If the thickness of the recording layer exceeds 45 nm, then the allowance for proper d1 and d2 rapidly becomes small.

Next, a method of producing an erasable optical information recording medium in accordance with the present invention is described below. The optical information recording medium of the present invention can be produced by successively laminating its layers by means of one of the methods usually used in producing an optical disk, ie. vacuum evaporation, magnetron sputtering, DC sputtering, ion beam sputtering, ion plating etc. In the present embodiment, a sputtering method is used. The sputter has three targets of an 100 mm system in one of its chamber, each facing the surface of the substrate. The substrate is rotated so that the distribution of each film thickness has a fluctuation less than ±3%. A DC power is used for sputtering the recording film and the reflecting film, and an RF power is used for sputtering the dielectric films. Each sputter time is determined by the deposition velocity measured beforehand, so that the five layers having the designed thicknesses are formed. Then a protecting material is pasted with an adhesive, so that a completed disk is obtained.

Whether an optical recording medium having a reflection layer is completed as designed is tested by measuring its reflectance and transmittance and comparing them with values calculated beforehand. The absorption by the recording layer and the reflecting layer can not be directly measured, but if the reflectance and the transmittance of the whole medium coincide with the calculated results, then the medium is judged to be made as designed. In order to test it more precisely, the wavelength of light to be used in testing is changed so that the reflectance and the transmittance of the medium are measured for different wavelengths. For example, if the reflectance and transmittance of a produced medium coincide with the corresponding calculated results for wavelengths 680 nm and 780 nm, then the medium is judged to be produced as designed, because the probability which reflectances and transmittances coincide with each other for two different wavelengths is very small. In practice, if the differences between the calculated results and the observed values are less than 2% to 3%, then the medium may be regarded as correctly realizing the designed structure.

Table 1 shows an actually obtained result of comparison of designed values with observed values. Since the difference for each item is within an error of 1%, this medium is judged to be made as designed.

TABLE 1

| | Design data and measurements | | | | |
|---|---|---|---|---|---|
| | R(cry) | R(amo) | ΔR | T(cry) | T(amo) |
| | Designed Value (%) | | | | |
| 780 nm | 26.1 | 8.7 | 17.4 | 15.3 | 44.2 |
| 680 nm | 29.0 | 9.9 | 19.1 | 6.6 | 22.3 |
| | Measurement (%) | | | | |
| 780 nm | 27.0 | 8.9 | 18.1 | 14.3 | 43.5 |
| 680 nm | 28.4 | 10.1 | 18.3 | 5.9 | 21.3 |

Whether a completed medium is in accordance with the present invention is tested by examining the layer structure of the medium (thicknesses, optical constants). In fact, whether the differences $\Delta A$ and $\Delta R$ of the medium satisfy one of the objectives of the present invention is tested by calculating these values based on the thicknesses and the optical constants of the layers. Further, the validity of the calculation is tested by comparing the observed values of the reflectance and the transmittance of the medium with their calculated values.

Figure 8:
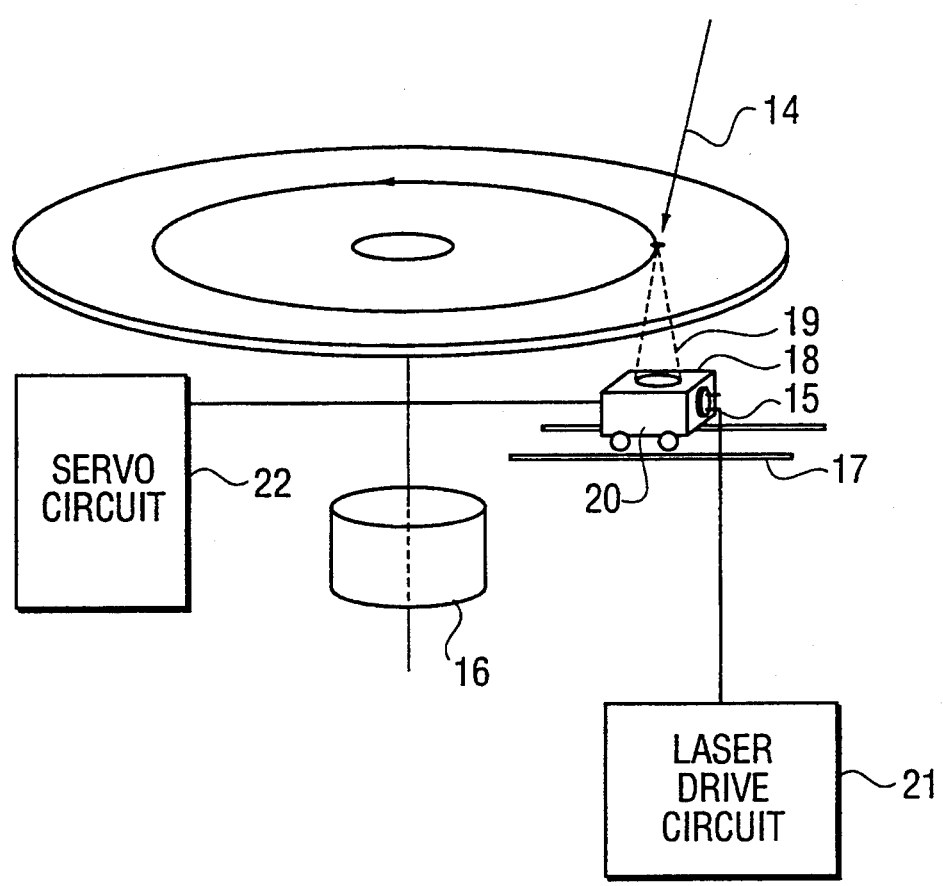
FIG. 8 shows an embodiment of a recording apparatus that uses optical recording media in accordance with the present invention.
Figure 9A:
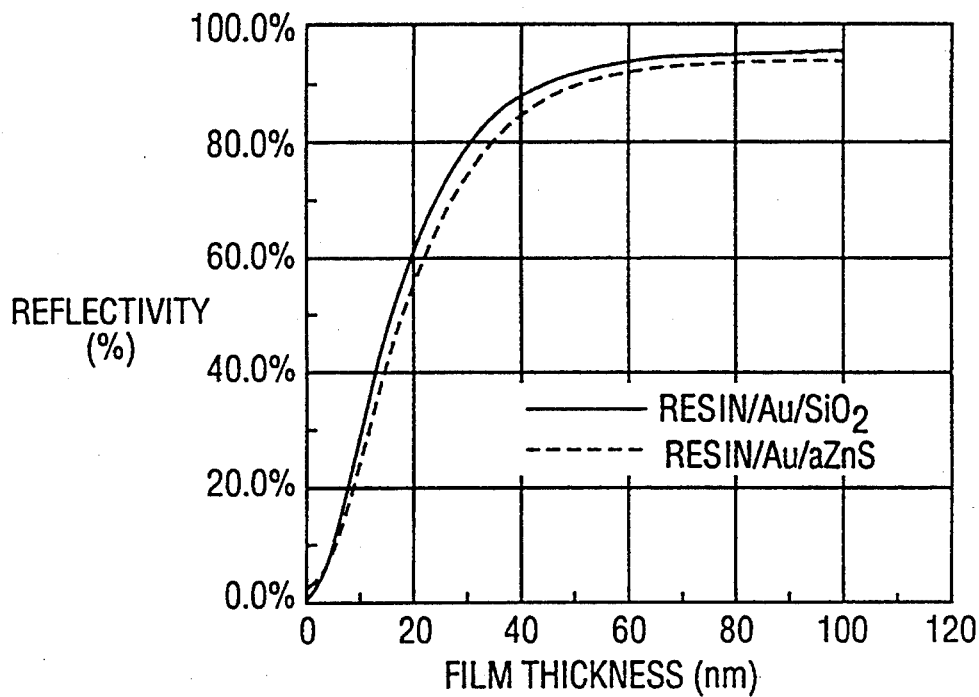
FIGS. 9(a) and 9(b) show the relation between the thickness of the reflecting layer (Au layer) and the reflectivity of the same, in the case that the Au layer is sandwiched between a resin layer and a dielectric layer and in the case that the Au layer is sandwiched between an air layer and a dielectric layer, respectively.
Figure 9B:
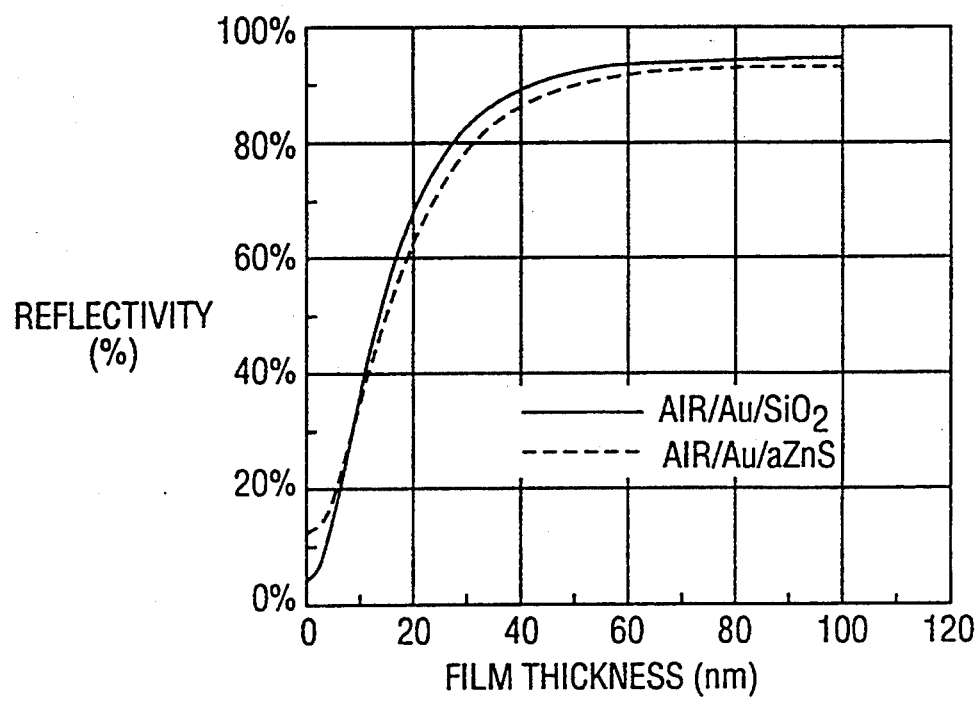
Figure 10:
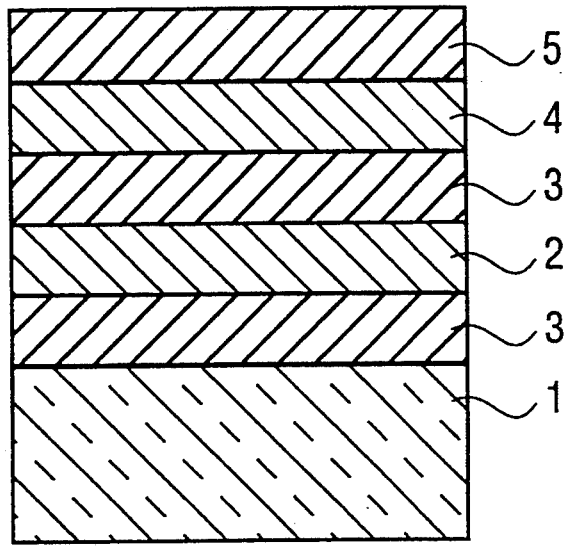
FIG. 10 shows the cross section of the structure of a prior phase change optical recording medium.
Figure 11:
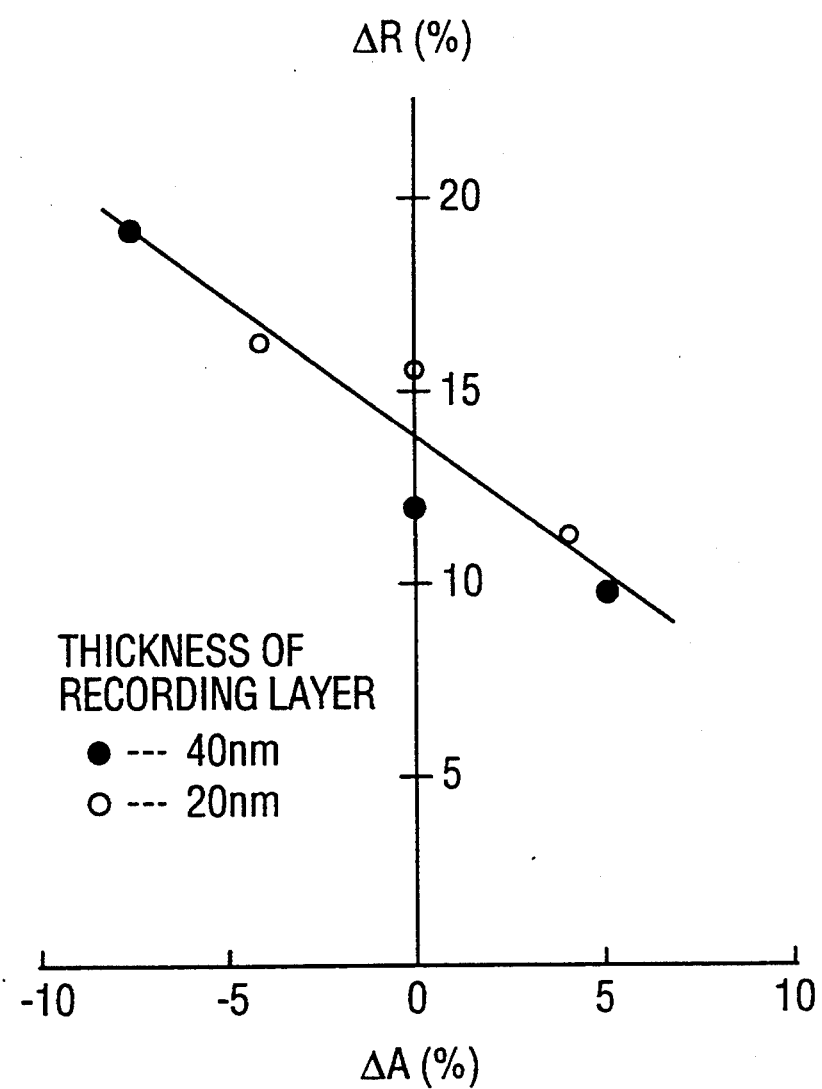
FIG. 11 shows the relation between the difference $\Delta A$ of the light absorption rates and the difference $\Delta R$ of the reflectances before and after recording in the recording medium described in a embodiment of a prior patent.

FIG. 8 shows an embodiment of recording apparatus that uses the optical information recording medium of the present invention. The apparatus is equipped with a laser diode 15 of wavelength λ=780 nm as its light source. A disk 14 comprises a recording layer of a phase change material inserted between two dielectric layers and a reflecting layer of a Au thin film. The disk 14 is designed to realize a C/N of more than 50 dB and an erasability of more than 30 dB at the same time in overwrite-recording with a laser beam of wavelength 780 nm. The disk 14 is driven at a constant number of revolutions by a motor 16 as a driving means. In order to make the linear velocity constant, the number of revolutions can be changed depending on the radius of recorded tracks. An optical head 20 can move to any location of the disk 14, by means of a transfer mechanism 17. The optical head 20 is equipped with the laser diode 15 and an optical assembly (omitted from FIG. 8) that concentrates the laser beam and focuses it onto the disk 14. A laser beam 19 emitted from the light source 15 is irradiated on the disk 14 through an object lens 18. To the optical head 20 are connected a laser driving circuit 21 that modulates the laser power and a servo-circuit 22 that controls the laser beam 19 for focusing, tracking, etc. so that it is located on an optimal position of the disk 14. The output power of the semiconductor laser is modulated depending on an information signal to be recorded. It is assumed that this apparatus performs overwriting using a single laser beam. Therefore a laser output power 23 is modulated between the two values of the peak level that is a comparatively high power and sufficient to amorphizing the recording layer and the bias-power level that is a comparatively low level and sufficient to crystallize the recording layer.

The present invention is described in more detail using the following examples performed actually.

Example 1

Five recording disks for laser wavelength 780 nm were produced using a sputtering apparatus equipped with four cathodes corresponding to targets of diameter 100 mm in its vacuum chamber, based on the calculation described earlier. The material of each substrate was polycarbonate, its size was 300 mm in outside diameter and 35 mm in inside diameter, its thickness was 1.2 mm long, and its surface was covered with a continuous groove 50 nm deep, 0.6 μm wide, and 1.3 μm in pitch. A first dielectric layer, a phase change recording film layer, a second dielectric layer, and a reflecting layer were formed on the side the substrate having the groove. The five prototype disks had almost the same structure except the thicknesses of their second dielectric layers. Their first dielectric layers were ZnS—SiO$_2$ (SiO$_2$: 20 mol %) mixture films 93 nm thick, their recording layers were Ge$_2$Sb$_2$Te$_5$ films 40 nm thick, their reflecting layers were Au films 10 nm thick, and their second dielectric layers were ZnS—SiO$_2$ (SiO$_2$: 20 mol %) mixture films, respectively 128 nm, 139 nm, 151 nm, 162 nm, and 174 nm thick. Table 2 shows the designed values of their ΔA and ΔR, which were different from each other.

TABLE 2

Thicknesses and optical characteristics of prototype disks

| No. | Thickness of Dielectric Layer (nm) First | Thickness of Dielectric Layer (nm) Second | ΔA (%) | ΔR (%) |
| --- | --- | --- | --- | --- |
| 1 | 93 | 128 | 19.1 | 11.8 |
| 2 | 93 | 139 | 14.1 | 17.7 |
| 3 | 93 | 151 | 7.8 | 21.2 |
| 4 | 93 | 162 | 2.9 | 21.4 |
| 5 | 93 | 174 | 0.4 | 19.4 |

Argon was used as the sputter gas, and its pressure was 3 mtorr. The dielectric material was deposited by the RF sputtering method at 10 nm per minute with a power of 300 W to form a film. The recording layer was deposited by the DC sputtering method at 10 nm per minute with power 100 W. Table 3 shows the comparison of the calculated values of the reflectances and the transmittances of the five prototype disks and the observed values measured with a spectrometer. From Table 3, it was recognized that the calculated values and the observed values coincided with each other quite well. Further, the observed values of ΔR obtained from the upper and lower parts of Table 3 coincided with the calculated values of ΔR. Therefore the prototype recording disks had almost the same optical characteristics as designed. As a result, it was concluded that the prototypes No. 1, No. 2, and No 3 were recording media in accordance with the present invention. In fact, No. 1 satisfied condition (B), and No. 2 and No. 3 satisfied condition (A).

TABLE 3

Optical characteristics of prototype disks (Designed values and measurements)

| No. | R(cry) λ = 780 nm Calculated Value (%) | R(cry) λ = 780 nm Measurement (%) | T(cry) λ = 780 nm Calculated Value | T(cry) λ = 780 nm Measurement (%) |
| --- | --- | --- | --- | --- |
| Recording layer in the crystal state | | | | |
| 1 | 32.6 | 32.9 | 7.3 | 7.4 |
| 2 | 30.7 | 30.4 | 7.2 | 7.2 |
| 3 | 30.0 | 29.8 | 5.9 | 5.9 |
| 4 | 30.3 | 30.3 | 4.5 | 4.6 |
| 5 | 30.9 | 30.8 | 3.5 | 3.4 |
| Recording layer in the amorphous state | | | | |
| 1 | 20.8 | 20.6 | 38.2 | 38.5 |
| 2 | 13.1 | 13.3 | 38.9 | 39.0 |
| 3 | 8.8 | 8.9 | 34.9 | 34.5 |
| 4 | 8.8 | 9.0 | 28.9 | 28.7 |
| 5 | 11.5 | 11.5 | 23.3 | 23.2 |

Example 2

Two disks of each type of Example 1 were bonded together, their film sides inside, with a hot-melt adhesive. Then each disk was revolved at a speed of 1800 revolutions per minute, and its overwriting characteristics were evaluated on its outermost part (linear velocity 27 m/s). Assuming the mark-edge recording method, the recorded signals were single-frequency signals of 17.5 MHz (f1) and 6.5 MHz (f2). A semiconductor laser beam of wavelength 780 nm was focused on each disk through an object lens of N.A. 0.55, and recording was performed at duty 50%. The size of a recorded mark for the signal of frequency f1 was 0.77 μm, which was less than the wavelength of the laser beam. After the signal of frequency f1 was recorded, and the CN ratio was measured, the signal of frequency f2 was overwritten, and the extinction coefficient of the f1 component was measured as an erasability.

Table 4 shows, for each prototype disk, the peak power where the CN ratio reaches 50 dB (the output power limit of the laser was 30 mW on the disk surface), the saturated value of the CN ratio, the maximum erasability, and the range of the bias power where the erasability exceeds 26 dB.

TABLE 4

Recording characteristics of prototype disks (C/N), Erasability)

| No. | Recording Power (mW) | CN Ratio (dB) | Maximal Erasability (dB) | Bias Power (mW) |
| --- | --- | --- | --- | --- |
| 1 | — | 48 | 36 | 11~15 |
| 2 | 22 | 57 | 38 | 11~15 |
| 3 | 21 | 59 | 35 | 10.5~14 |
| 4 | 20 | 60 | 24 | — |
| 5 | 20 | 58 | 22 | — |

By comparing Table 4 with Table 2, it was observed that the ΔR and the ΔA of Table 2 had respectively strong correlation with the CN ratio and the erasability and bias power range in Table 4. If ΔA was less than 5%, the bias power range where the erasability exceeds 26 dB was not obtained. In order to realize an equivalent temperature-up in the crystal and the amorphous parts, the amorphous part requires the absorption of more energy equivalent to the latent heat of fusion. Therefore, it seems that about 5% ΔA was necessary for this extra energy. It was also observed that, in order to obtain a CN ratio of more than 50 dB, more than 15% ΔR was necessary. In conclusion, the optical disks No.

2 and No. 3 had CN ratios of more than 50 dB and erasabilities of more than 26 dB with wide power ranges.

When the recording frequencies f1 and f2 were made respectively 14 MHz and 5,2 MHz, so that the size of the recorded marks were greater than the diameter of the light spot, and the experiment was performed using the same disks, then a CN ratio of over 55 dB and a maximal erasability of 41 dB were obtained even from disk No. 1.

Example 3

As Examples 1 and 2, a variety of recording media were produced using polycarbonate substrates, $ZnS$—$SiO_2$ mixture films, and $Ge_2Sb_2Te_5$ films, and their characteristics were evaluated. The thicknesses of their recording layers were gradually varied from 20 nm to 80 nm, and the thicknesses of their reflecting layers were gradually varied from 3 nm to 50 nm. Table 5 shows the result obtained from the evaluation of their characteristics. In Table 5, symbol ○ indicates that a large region (e.g. ±5%) of film thicknesses of the upper and lower dielectric layers such that condition (A), ie. $\Delta R \geq 15\%$ and $\Delta A \geq 5\%$, is satisfied exists, symbol Δ indicates that film thicknesses for the dielectric layers such that condition (A) is satisfied exist, and symbol × indicates that condition (A) is not satisfied. From Table 5, it was observed that there exist an upper limit of the thickness of the recording layer and an upper limit of the thickness of the reflecting layer for a recording medium in accordance with the present invention, and if the thickness of the recording layer is less than 55 nm and the thickness of the reflecting layer is less than 15 nm, then such a recording medium can be constructed.

TABLE 5

The thicknesses of recording layer and reflecting layer in accordance with the present invention

| Recording Layer (nm) | Reflecting layer (nm) | | | | | | | | | |
|---|---|---|---|---|---|---|---|---|---|---|
| | 3 | 5 | 8 | 10 | 15 | 20 | 25 | 30 | 40 | 50 |
| 20 | ○ | ○ | ○ | ○ | ○ | Δ | Δ | × | × | × |
| 25 | ○ | ○ | ○ | ○ | ○ | Δ | Δ | × | × | × |
| 30 | ○ | ○ | ○ | ○ | ○ | Δ | Δ | × | × | × |
| 35 | ○ | ○ | ○ | ○ | ○ | Δ | Δ | × | × | × |
| 40 | ○ | ○ | ○ | ○ | ○ | Δ | Δ | × | × | × |
| 45 | ○ | ○ | ○ | ○ | ○ | Δ | Δ | × | × | × |
| 50 | Δ | ○ | ○ | ○ | ○ | Δ | × | × | × | × |
| 55 | Δ | Δ | ○ | Δ | Δ | × | × | × | × | × |
| 60 | × | Δ | Δ | × | × | × | × | × | × | × |
| 65 | × | × | × | × | × | × | × | × | × | × |
| 70 | × | × | × | × | × | × | × | × | × | × |
| 75 | × | × | × | × | × | × | × | × | × | × |

Example 4

The same experiments as Examples 1, 2, and 3 were performed for a glass substrate, it was observed that the media in accordance with the present invention were excellent in their CN ratios and overwriting erasabilities.

Example 5

In Example 2, similar evaluation was performed on the innermost part (linear velocity 10 m/s) of each disk. The recording frequencies were f1=6.5 MHz and f2=2.4 MHz. As in the evaluation on the outermost part, disks No. 2 and No. 3 showed CN ratios of more than 50 dB and erasabilities of more than 26 dB with wide power ranges. Disk No. 4 had also a CN ratio of more than 50 dB and an erasability of more than 26 dB, but its admissible power range was narrow.

Example 6

Compositions of Ge—Sb—Te ternary alloys were varied over the triangle with its vertex compositions $Ge_2Sb_2Te_5$, $GeSb_4Te_7$, and Sb in the Ge—Sb—Te triangular composition coordinates, and their optical constants were obtained by experiments. Then the calculation for and the evaluation of prototypes were made on these data. As a result, if the densities of Sb were less than 40%, then recording media using the compositions and in accordance with the present invention and having high overwrite erasabilities were produced.

Example 7

Four-layer recording media of the present invention were produced using an in-line type sputtering apparatus having three connected vacuum chambers. These vacuum chambers respectively form $ZnS$—$SiO_2$ ($SiO_2$: 20 mol %) films, $Ge_2Sb_2Te_5$ films, and Al—Cr (Cr: 3 at %) films. Ar gas was used as the sputter gas, and the recording and reflecting layers were sputtered with DC, and dielectric layers were sputtered with RF. The films were formed in the order of the first dielectric layer, the recording layer, the second dielectric layer, and the reflecting layer, and the second dielectric layer was formed back in the first chamber.

The optical constants of each layer were obtained as follows. After a film of each material was formed on a Pyrex ® glass plate, its reflectance and transmittance for wavelength 780 nm were measured with a spectrometer, and its thickness was measured. As for the recording film, after its thickness was measured in the amorphous state with a step measurement meter, it was crystallized in an Ar atmosphere, and its thickness, reflectance and transmittance were measured again. Then, based on these values, the optical constants of each film material were calculated. The results are shown in Table 6.

TABLE 6

| Optical constants of each film material | | | | |
|---|---|---|---|---|
| | $Ge_2Sb_2Te_5$ (amo) | $Ge_2Sb_2Te_5$ (cry) | $ZnS$—$SiO_2$ | Al—Cr |
| Refractive Index | 4.6 | 5.5 | 2.1 | 2.4 |
| Extinction Coefficient | 1.5 | 4.2 | 0 | 7.4 |

The reflectance of each medium, the absorption rate of its recording layer for wavelength 780 nm were calculated depending on the parametric thicknesses of its all layers by the matrix method based on the above optical characteristics, and seven recording media having gradually varying absorption differences ΔA were produced as prototypes. The substrate of each medium was a polycarbonate disk having refractive index 1.58, and its size was 300 mm in outside diameter, 35 mm in inside diameter, and 1.2 mm thick. The surface of the substrate was covered with a continuous groove 60 nm deep, 0.6 μm wide, and 1.3 μm in pitch.

As shown in Table 7, the seven prototypes had almost the same structure except the thicknesses of their second dielectric layers. Their first dielectric layers were $ZnS$—$SiO_2$ ($SiO_2$: 20 mol %) mixture films 82 nm thick, their recording layers were $Ge_2Sb_2Te_5$ films 30 nm thick, their reflecting layers were Al—Cr films 10 nm thick, and their second dielectric layers were ZnS—SiO$_2$ (SiO$_2$: 20 mol %) mixture films, respectively 151 nm, 162 nm, 168 nm, 174 nm, 180 nm, 186 nm, and 197 nm thick. The designed values of ΔA and ΔR of each prototype were as shown in Table 7.

TABLE 7

Thicknesses and optical characteristics of prototype disks

| NO. | Thickness of Dielectric Layer (nm) | | ΔA (%) | ΔR (%) |
|---|---|---|---|---|
| | First | Second | | |
| 1 | 82 | 151 | 21.9 | 5.5 |
| 2 | 82 | 162 | 19.1 | 13.5 |
| 3 | 82 | 168 | 15.3 | 17.8 |
| 4 | 82 | 174 | 10.7 | 21.4 |
| 5 | 82 | 180 | 5.9 | 23.5 |
| 6 | 82 | 186 | 1.9 | 24.2 |
| 7 | 82 | 197 | −2.8 | 22.6 |

Table 8 shows the comparison of the calculated values of the reflectances and the transmittances of the above seven prototype disks and the observed values measured with a spectrometer. From Table 8, it was recognized that the calculated values and the observed values coincided quite well, when the recording layer of each disk was in both the crystal and amorphous states. Further, the observed values of ΔR obtained from the upper and lower parts of Table 3 coincided with the calculated values of ΔR. Therefore the prototype recording disks had almost the same optical characteristics as designed. As a result, it was concluded that the prototypes No. 2, No. 3, No. 4, and No. 5 were recording media in accordance with the present invention. In fact, No. 2 satisfied condition (B), and No. 3, No. 4, and No. 5 satisfied condition (A).

TABLE 8

Optical characteristics of prototype disks (Designed values and measurements)

| No. | R(cry) λ = 780 nm | | T(cry) λ = 780 nm | |
|---|---|---|---|---|
| | Calculated Value (%) | Measurement (%) | Calculated Value | Measurement (%) |
| Recording layer in the crystal state | | | | |
| 1 | 40.5 | 40.4 | 4.6 | 4.6 |
| 2 | 34.2 | 34.5 | 4.8 | 4.8 |
| 3 | 31.1 | 31.6 | 4.5 | 4.5 |
| 4 | 28.9 | 28.8 | 3.6 | 3.7 |
| 5 | 27.6 | 27.5 | 3.1 | 3.2 |
| 6 | 27.1 | 27.0 | 2.4 | 2.5 |
| 7 | 27.4 | 27.5 | 1.7 | 1.6 |
| Recording layer in the amorphous state | | | | |
| 1 | 35.0 | 34.9 | 13.4 | 13.3 |
| 2 | 20.7 | 21.1 | 15.4 | 15.7 |
| 3 | 13.3 | 13.5 | 14.1 | 14.2 |
| 4 | 7.5 | 7.5 | 13.9 | 13.8 |
| 5 | 4.1 | 4.1 | 12.4 | 12.4 |
| 6 | 2.9 | 2.8 | 10.9 | 11.0 |
| 7 | 4.8 | 4.8 | 8.1 | 8.3 |

Example 8

Two disks of each type of Example 7 were bonded together, their film sides inside, with a hot-melt adhesive. Then each disk was revolved at a speed of 1800 revolutions per minute by a recording apparatus of FIG. 8, and its overwriting characteristics were evaluated on its outermost part (linear velocity 27 m/s). In order to perform higher density recording than prior recording, so that the mark-pitch becomes 1.3 μm, the recorded signals were single-frequency signals of 21 MHz (f1) and 8 MHz (f2). A semiconductor laser beam of wavelength 780 nm was focused on each disk through an object lens of N.A. 0.55.

After the signal of frequency f1 was recorded, and the CN ratio was measured, the signal of frequency f2 was overwritten, and the extinction rate of the f1 component was measured to obtain the erasability. Table 9 shows, for each prototype disk, the peak power where the CN ratio reaches 50 dB, the saturated value of the CN ratio, the maximum erasability, and the range of the bias power where the erasability exceeds 26 dB.

TABLE 9

Recording characteristics of prototype disks (C/N), Erasability)

| No. | Recording Power (mW) | CN Ratio (dB) | Maximal Erasability (dB) | Bias Power (mW) |
|---|---|---|---|---|
| 1 | — | 47 | 35 | 11~15 |
| 2 | — | 49 | 36 | 11~15 |
| 3 | 22 | 53 | 37 | 10.5~14 |
| 4 | 21 | 57 | 39 | 10~14 |
| 5 | 20 | 58 | 29 | 9.5~13 |
| 6 | 20 | 61 | 21 | — |
| 7 | 19 | 60 | 20 | — |

From Tables 7 and 9, the following facts were observed. The ΔR and the ΔA of Table 7 had respectively strong correlation with the CN ratio and the erasability and bias power range. If ΔA was 5.9%, then a sufficiently large erasability was obtained, but if ΔA was about 1.9%, then the bias power range where the erasability exceeds 26 dB was not obtained.

Further investigation on the relation between the erasability and ΔA showed that at least 3% ΔA and preferably more than 5% ΔA was necessary to obtain an erasability of 26 dB. In order to realize an equivalent temperature up in the crystal and the amorphous parts, the amorphous part requires the absorption of more energy equivalent to the latent heat of fusion. Therefore, it seems that about 3% ΔA was necessary for this extra energy. It was also observed that, in order to obtain a CN ratio of more than 50 dB, more than 15% ΔR was necessary.

A larger erasability was obtained with less ΔA in case Al—Cr was used for the reflecting layer as in this Example than when Au was used. The reason seems due to the difference of their thermal Conductivity. In conclusion, optical disks No. 3, 4, and 5 had CN ratios of more than 50 dB and erasabilities of more than 26 dB with wide power ranges.

Example 9

In Example 8, the recording frequencies were changed into f1=14.7 MHz and f2=5.6 MHz, so that the recording marks were made larger than the size of the diameter of a light spot. Similar experiments as in Example 8 showed that disk No. 2 had a CN ratio of 55 dB and an erasability of 41 dB.

Example 10

As examples 7 and 8, a variety of recording media were produced using polycarbonate substrates, ZnS—SiO$_2$ mixture films, and Ge$_2$Sb$_2$Te$_5$ films, and their characteristics were evaluated. The thicknesses of their recording layers were gradually varied from 20 nm to 80 nm, and the thicknesses of their reflecting layers were gradually varied from 3 nm to 100 nm. Table 10 shows the result obtained from the evaluation of their characteristics. In Table 10, symbol ○ indicates that a large region (e.g. ±3%) of film thicknesses of the upper and lower dielectric layers such that condition (A), ie. $\Delta R \geq 15\%$ and $\Delta A \geq 5\%$, is satisfied exists, symbol $\Delta$ indicates that film thicknesses of the dielectric layers such that condition $\Delta R \geq 15\%$ and $\Delta A \geq 3\%$ is satisfied exist, and symbol × indicates that this condition is not satisfied.

TABLE 10

The thicknesses of recording layer and reflecting layer in accordance with the present invention

| Recording Layer (nm) | Reflecting Layer (nm) | | | | | | | | | |
|---|---|---|---|---|---|---|---|---|---|---|
| | 5 | 10 | 15 | 20 | 30 | 40 | 50 | 70 | 100 | 200 |
| 20 | ○ | ○ | ○ | Δ | Δ | Δ | Δ | Δ | Δ | Δ |
| 25 | ○ | ○ | ○ | Δ | Δ | Δ | Δ | Δ | Δ | Δ |
| 30 | ○ | ○ | Δ | Δ | Δ | Δ | Δ | Δ | Δ | Δ |
| 35 | ○ | ○ | Δ | Δ | Δ | Δ | Δ | Δ | Δ | Δ |
| 40 | ○ | ○ | Δ | Δ | Δ | Δ | Δ | Δ | Δ | Δ |
| 45 | ○ | Δ | Δ | Δ | Δ | x | x | x | x | x |
| 50 | Δ | Δ | Δ | Δ | x | x | x | x | x | x |
| 55 | x | Δ | x | x | x | x | x | x | x | x |
| 60 | x | x | x | x | x | x | x | x | x | x |
| 65 | x | x | x | x | x | x | x | x | x | x |
| 70 | x | x | x | x | x | x | x | x | x | x |
| 75 | x | x | x | x | x | x | x | x | x | x |
| 80 | x | x | x | x | x | x | x | x | x | x |

From this evaluation, it was observed that if the thickness of the recording layer is made less than 40 nm, then a recording medium in accordance with the present invention can be constructed regardless of the thickness of Al—Cr reflecting layer. Also, even if the thickness of the Al—Cr recording layer was made as thick as 200 nm, where no light does not pass through it, a recording medium in accordance with the present invention was constructed.

Example 11

Similar evaluation as in Example 8 was performed on the innermost part (linear velocity 10 m/s) of each disk of Example 8. The recording frequencies were f1=7.8 MHz and f2=3.0 MHz. As in the evaluation on the outermost part, disks No. 3, No. 4, and No. 5 showed CN ratios of more than 50 dB and erasabilities of more than 26 dB with wide admissible power ranges. Disk No. 6 had also a CN ratio of more than 50 dB and an erasability of more than 26 dB, but its admissible power range was narrower than disks No. 3, No. 4, and No. 5.

Example 12

Using Al—Ta, Al—Au and Al—Ti alloy films having additives Ta, Au, and Ti of densities 1%, 3%, 5%, 10%, 15% and 20% in place of Cr, the experiments of the above Examples 6 to 10 were performed. It was confirmed that if the density of the additives is less than 5%, recording media in accordance with the present invention can be constructed in the same way as when the above Al—Cr alloy (Cr: 3%) was used. If the density exceeded 15%, then the admissible power range for the lower speed condition became narrow.

Example 13

Prototypes of recording media without reflecting layers were produced and evaluated using a sputtering apparatus equipped with four cathodes corresponding to targets of diameter 100 mm in its vacuum chamber. Five recording disks for laser wavelength 680 nm were produced based on the calculation described earlier. The material of each substrate was polycarbonate, its size was 300 mm in outside diameter and 35 mm in inside diameter, its thickness was 1.2 mm long, and its surface was covered with a continuous groove 60 nm deep, 0.6 μm wide, and 1.3 μm in pitch. A first dielectric layer, a phase change recording film layer, and a second dielectric layer were formed on the side having the groove.

TABLE 11

Thicknesses and optical characteristics of prototype disks

| No. | Second Dielectric Layer (nm) | ΔA (%) | | ΔR (5) | |
|---|---|---|---|---|---|
| | | Calculated | Measured | Calculated | Measured |
| 1 | 70 | 9.3 | 9.5 | 13.5 | 13.2 |
| 2 | 93 | 7.8 | 7.7 | 15.3 | 15.5 |
| 3 | 116 | 5.0 | 5.1 | 16.7 | 16.8 |
| 4 | 139 | 2.9 | 2.7 | 16.7 | 16.7 |
| 5 | 162 | 2.4 | 2.3 | 15.7 | 15.6 |

The five prototype disks had almost the same structure except the thicknesses of their second dielectric layers as shown in Table 11. Their first dielectric layers were ZnS—SiO$_2$ (SiO$_2$: 20 mol %) mixture films 93 nm thick, their recording layers were Ge$_2$Sb$_2$Te$_5$ films 30 nm thick, and their second dielectric layers were ZnS—SiO$_2$ (SiO$_2$: 20 mol %) mixture films, respectively 70 nm, 93 nm, 116 nm, 139 nm, and 162 nm thick. Their differences of the absorption rates ΔA and differences of reflectances ΔR were different from each other. Argon was used as the sputter gas, and its pressure was 3 mtorr. The dielectric material was deposited by the RF sputtering method at 10 nm per minute with a power of 300 W to form a film. The recording layer was deposited by the DC sputtering method at 10 nm per minute with power 100 W. Table 11 shows the calculated values of the ΔA and ΔR of the five prototype disks and their observed values measured with a spectrometer, when the thicknesses of their second dielectric layers were varied. From Table 11, it was recognized that the calculated values and the observed values coincided quite well, and each medium satisfied condition (A) $\Delta A \geq 5\%$ and $\Delta R \geq 15\%$, so that media in accordance with the present invention were actually constructed, and media that satisfy condition (A) are easily designed by the method of the present invention.

Example 14

Two disks of each type of Example 13 were bonded together, their film sides inside, with a hot-melt adhesive. Then each pasted disk was revolved at a speed of 1800 revolutions per minute, and its overwriting characteristics were evaluated on its outermost part (linear velocity 27 m/s). Assuming the mark-edge recording method, the recorded signals were single-frequency signals of 17.5 MHz (f1) and 6.5 MHz (f2). A semiconductor laser beam of wavelength 680 nm was focused on each disk through an object lens of N.A. 0.55, and recording was performed at duty 50%.

After the signal of frequency f1 was recorded, and the CN ratio was measured, the signal of frequency f2 was overwritten, and the extinction rate of the f1 component was measured to obtain the erasability. Table 12 shows, for each prototype disk, the peak power where the CN ratio reaches 50 dB (the output power limit of the laser is 16 mW on the disk surface), the saturated value of the CN ratio, the maximum erasability, and the range of the bias power where the erasability exceeds 26 dB.

TABLE 12

| No. | Recording Power (mW) | CN Ratio (dB) | Maximal Erasability (dB) | Bias Power (mW) |
|---|---|---|---|---|
| 1 | — | 48 | 33 | 8~12 |
| 2 | 16 | 52 | 35 | 8~12 |
| 3 | 15 | 55 | 30 | 7.5~11 |
| 4 | 14 | 55 | 26 | 7 |
| 5 | 14 | 53 | 22 | — |

Recording characteristics of prototype disks (C/N, Erasability)

As observed from Table 12, the ΔR and the ΔA of Table 11 had respectively strong correlation with the CN ratio and the erasability and the bias power range of Table 12. If ΔA was less than 5%, the bias power range where the erasability exceeds 26 dB was almost nonexistent. In order to realize an equivalent temperature up in the crystal and the amorphous parts, the amorphous part requires the absorption of more energy equivalent to the latent heat of fusion. Therefore, it seems that 5% ΔA was necessary for this extra energy. It was also observed that, in order to obtain a CN ratio of more than 50 dB, a more than 15% ΔR was necessary.

Next, using the same disks, similar evaluation was performed on the innermost part (linear velocity 10 m/s) of each disk. The recording frequencies were f1=7.8 MHz and f2=3 MHz. A result showed that as the bias power increased, the amplitude of the signals greatly decreased. It seems that the effects of heat accumulation are great in the innermost part. Therefore, a structure without a reflecting layer should be used in the area where the liner velocity is relatively large, and the limit of the adequate linear velocity is over 15 m/s according to experiments.

Example 15

Using polycarbonate substrates, ZnS—SiO2 mixture films, and Ge2Sb2Te5 films, the relation between the laser wavelengths used for recording and playback and the film thicknesses of the recording layers in accordance with the present invention were investigated. First recording media satisfying condition (A) ΔR≧15% and ΔA≧5% were produced for wavelengths 680 nm, 780 nm, 830 nm. Next, the optical characteristics of the prototype media were measured and compared with the designed values.

Table 13 shows a result of the evaluation. In Table 13, ⊚ indicates that a disk satisfying ΔR≧20% and ΔA≧5% or ΔR≧15% and ΔA≧10% was produced, ○ indicates that a disk satisfying ΔR≧15% and ΔA≧5% or ΔR≧10% and ΔA≧10% was produced, and X indicates that any of these conditions are not satisfied. From Table 13, it was concluded that if the thickness of the recording layer is less than 40 nm, then a recording medium in accordance with the present invention can be constructed regardless of the laser wavelength that is within the range of the wavelengths of presently available semiconductor lasers.

TABLE 13

| Thickness of Recording Film | Laser Wavelength Used for Recording and Playback | | |
|---|---|---|---|
| | 680 nm | 780 nm | 830 nm |
| 20 nm | ⊚ | ⊚ | ⊚ |
| 25 nm | ⊚ | ⊚ | ⊚ |
| 30 nm | ○ | ○ | ○ |
| 35 nm | ○ | ○ | ○ |
| 40 nm | ○ | ○ | ○ |
| 45 nm | x | ○ | ○ |
| 50 nm | x | x | x |

Thickness of the recording medium in accordance with the present invention

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical information recording medium made by laminating at least four layers on a substrate, the first being a first dielectric thin film layer, the second being a recording layer consisting of a thin film of a phase change material that, by irradiation with a laser beam of wavelength λ, makes a reversible change of the optical characteristics between the crystal state in which the optical constants, that is, the refractive index n and the extinction coefficient k, are relatively large and the amorphous state in which the optical constants are relatively small, the third being a second dielectric thin film layer, and the fourth being a reflecting layer consisting of metal thin film, the thickness of said recording layer being set so that the transmittance of said recording layer sandwiched between said first and second dielectric thin film layers is at least 1% when said recording layer is in the crystal state and when evaluated assuming that the thickness of each of said first and second dielectric thin film layers is infinitely large, the thickness of said reflecting layer being set so that the reflectance of said reflecting layer is less than 60% when measured in a state sandwiched between a dielectric layer and a resin layer, and the thicknesses of said first and second dielectric thin film layers being chosen so that, if R(amo) and A(amo) respectively denote the reflectance of said information recording medium and the light absorption rate of said recording layer at the time when said recording layer is in the amorphous state, and if R(cry) and A(cry) respectively denote the reflectance of said information recording medium and the light absorption rate of said recording layer at the time when said recording layer is in the crystal state, then a condition: ΔR+ΔA=R(cry)−R(amo)+A(cry)−A(amo)≧20% and ΔA=A(cry)−A(amo)≧5% is satisfied.

2. The information recording medium of claim 1 wherein said reflecting layer is made of Au and its thickness is set to 3 nm to 15 nm.

3. The information recording medium of claim 1 wherein said reflecting layer is a film of a Au-based alloy containing, as its component of at most 15%, at least one selected from the group of material consisting of Al, Cr, Cu, Ge, Co, Ni, Mo, Ag, Pt, Pd, Co, Ta, Ti, Bi, and Sb.

4. The information recording medium of claim 1 wherein $\Delta A \geq 10\%$.

5. The information recording medium of claim 1 wherein $\Delta R \geq 15\%$.

6. The information recording medium of claim 1 wherein the material of said first and second dielectric thin film layers is ZnS—SiO$_2$, the material of said recording layer is Ge—Sb—Te, and the thickness of said recording layer is less than 40 nm.

7. The information recording medium of claim 1 wherein the material of said first and second dielectric thin film layers is ZnS—SiO$_2$, the material of said recording layer is Ge—Sb—Te, and the thickness of said recording layer is less than 25 nm.

8. An optical information recording medium made by laminating at least four layers on a substrate, the first being a first dielectric thin film layer, the second being a recording layer consisting of a thin film of a phase change material that, by irradiation with a laser beam of wavelength $\lambda$, makes a reversible change of the optical characteristics between the crystal state in which the optical constants, that is, the refractive index n and the extinction coefficient K, are relatively large and the amorphous state in which the optical constants are relatively small, the third being a second dielectric thin film layer, and the fourth being a reflecting layer consisting of a metal thin film, the thickness of said recording layer set chosen so that the transmittance of said information recording medium sandwiched between said first and second dielectric thin film layers is at least 1% when said recording layer is in the crystal state and when evaluated assuming that the thickness of each of said first and second dielectric thin film layers is infinitely large, the principal component of said reflecting layer being one material selected from the group consisting of Al, Ti, Ni, and Cr, and alloys composed of a plurality of metals selected from the group consisting of Al, Ti, Ni, and Cr, and the thicknesses of said first and second dielectric film layers being chosen so that, if R(amo) and A(amo) respectively denote the reflectance of information recording medium and the light absorption rate of said recording layer at the time when said recording layer is in the amorphous state, and if R(cry) and A(cry) respectively denote the reflectance of said information recording medium and the light absorption rate of said recording layer at the time when said recording layer is in the crystal state, then conditions: $\Delta A + \Delta R = A(cry) - A(amo) + R(cry) - R(amo) \geq 20\%$ and $\Delta A = A(cry) - A(amo) \geq 5\%$ are satisfied.

9. The information recording medium of claim 8 wherein said reflecting layer is an alloy thin film composed of Al as a main component and at least one material of at most 15% which is selected from the group consisting of Au, Cr, Cu, Ge, Co, Ni, Ag, Pt, Pd, Co, Ta, Ti, Bi, Sb, and Mo.

10. The information recording medium of claim 8 wherein $\Delta A \geq 10\%$.

11. The information recording medium of claim 8 wherein $\Delta R \geq 15\%$.

12. The information recording medium of claim 8 wherein the material of said first and second dielectric thin film layers is ZnS—SiO$_2$, the material of said recording layer is Ge—Sb—Te, and the thickness of said recording layer is less than 40 nm.

13. The information recording medium of claim 8 wherein the material of said first and second dielectric thin film layers is ZnS—SiO$_2$, the material of said recording layer is Ge—Sb—Te, and the thickness of said recording layer is less than 25 nm.

14. The recording information medium of claim 1 or claim 8, further including a protecting layer deposited on said reflecting layer.

15. An optical information recording medium made by laminating at least three layers on a substrate, the first being a first dielectric thin film layer, the second being a recording layer consisting of a thin film of a phase change material that, by irradiation with a laser beam of wavelength $\lambda$, makes a reversible change of the optical characteristics between the crystal state in which the optical constants, that is, the refractive index n and the extinction coefficient K, are relatively large and the amorphous state in which the optical constants are relatively small, and the third being a second dielectric thin film layer, the thickness of said recording layer is chosen so that, if T0(amo) and T0(cry) denote the transmittances of said recording layer sandwiched between said first and second dielectric thin film layers at the time when said recording layer is in the amorphous state, and in the crystal state, respectively, then $\Delta T - T0(amo) - T0(cry) \geq 20\%$ assuming that the thickness of each of said first and second dielectric thin film layers is infinitely large, the thicknesses of said first and second dielectric film layers being chosen so that, if R(amo) and A(amo) respectively denote the reflectance of said information recording medium and the light absorption rate of said recording layer at the time when said recording layer is in the amorphous state, and if R(cry) and A(cry) respectively denote the reflectance of said information recording medium and the light absorption rate of said recording layer at the time when said recording layer is in the crystal state, then conditions: $\Delta A + \Delta R = A(cry) - A(amo) + R(cry) - R(amo) \geq 20\%$ and $\Delta A = A(cry) - A(amo) \geq 5\%$ are satisfied.

16. The information recording medium of claim 15 wherein the thickness of said recording layer is chosen so that $\Delta T0 \geq 25\%$, and the thicknesses of said first and second dielectric layers are chosen so that $\Delta A \geq 10\%$.

17. The information recording medium of claim 15 wherein the thickness of said recording layer is chosen so that $\Delta T0 \geq 25\%$, and the thicknesses of said first and second dielectric layers are chosen so that $\Delta R \geq 15\%$.

18. The information recording medium of claim 15 wherein the material of said first and second dielectric thin film layers is ZnS—SiO$_2$, the material of said recording layer is Ge—Sb—Te, and the thickness of said recording layer is less than 40 nm.

19. The information recording medium of claim 15 wherein the material of said first and second dielectric thin film layers is ZnS—SiO$_2$, the material of said recording layer is Ge—Sb—Te, and the thickness of said recording layer is less than 25 nm.

* * * * *